(12) United States Patent
Dolan et al.

(10) Patent No.: US 9,116,880 B2
(45) Date of Patent: Aug. 25, 2015

(54) GENERATING STIMULI FOR USE IN SOLICITING GROUNDED LINGUISTIC INFORMATION

(71) Applicant: Microsoft Corporation, Redmond, WA (US)

(72) Inventors: William B. Dolan, Kirkland, WA (US); Christopher I. Charla, Seattle, WA (US); Christopher B. Quirk, Seattle, WA (US); Christopher J. Brockett, Bellevue, WA (US); Noelle M. Sophy, Redmond, WA (US); Nicole Beaudry, Boston, MA (US); Vikram Reddy Dendi, Redmond, WA (US); Pallavi Choudhury, Redmond, WA (US); Scott T. Laufer, North Bend, WA (US); Robert A. Sim, Bellevue, WA (US); Thomas E. Woolsey, Bellevue, WA (US); David Molnar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 13/689,804

(22) Filed: Nov. 30, 2012

(65) Prior Publication Data
US 2014/0156259 A1    Jun. 5, 2014

(51) Int. Cl.
*G06F 17/27* (2006.01)
*G06F 17/28* (2006.01)

(52) U.S. Cl.
CPC .................................. *G06F 17/28* (2013.01)

(58) Field of Classification Search
CPC ... G06F 17/289; G06F 17/28; G06F 17/2785; G06F 17/21
USPC ........................................................ 704/2–10
See application file for complete search history.

(56) References Cited

U.S. PATENT DOCUMENTS 5,429,513 A * 7/1995 Diaz-Plaza .................... 434/167
6,302,697 B1 * 10/2001 Tallal et al. .................... 434/185

(Continued)

FOREIGN PATENT DOCUMENTS

CN         101105791 A      1/2008

OTHER PUBLICATIONS

Michael Denkowski, Hassan Al-Haj, Alon Lavie, Turker-assisted paraphrasing for English-Arabic machine translation, CSLDAMT '10 Proceedings of the NAACL HLT 2010 Workshop on Creating Speech and Language Data with Amazon's Mechanical Turk, pp. 66-70 2010.*

(Continued)

*Primary Examiner* — Douglas Godbold
(74) *Attorney, Agent, or Firm* — Sandy Swain; Judy Yee; Micky Minhas

(57) ABSTRACT

A processing system is described which generates stimulus information (SI) having one or more stimulus components (SCs) selected from an inventory of such components. The processing system then presents the SI to a group of human recipients, inviting those recipients to provide linguistic descriptions of the SI. The linguistic information that is received thereby has an implicit link to the SCs. Further, each linguistic component is associated with at least one feature of a target environment, such as a target computer system. Hence, the linguistic information also maps to the features of the target environment. These relationships allow applications to use the linguistic information to interact with the target environment in different ways. In one case, the processing system uses a challenge-response authentication task presentation to convey the stimulus information to the recipients.

25 Claims, 12 Drawing Sheets

(56) References Cited

U.S. PATENT DOCUMENTS

| | | | |
|---|---|---|---|
| 7,512,537 B2* | 3/2009 | Pahud et al. | 704/272 |
| 7,584,092 B2 | 9/2009 | Brockett et al. | |
| 7,901,211 B2* | 3/2011 | Pennebaker | 434/167 |
| 7,937,265 B1 | 5/2011 | Pasca et al. | |
| 8,704,948 B2* | 4/2014 | Mountain | 348/564 |
| 2006/0015320 A1 | 1/2006 | Och | |
| 2006/0053001 A1 | 3/2006 | Brockett et al. | |
| 2006/0106592 A1 | 5/2006 | Brockett et al. | |
| 2006/0106594 A1 | 5/2006 | Brockett et al. | |
| 2006/0106595 A1 | 5/2006 | Brockett et al. | |
| 2007/0282594 A1 | 12/2007 | Spina | |
| 2008/0208849 A1 | 8/2008 | Conwell | |
| 2009/0299724 A1 | 12/2009 | Deng et al. | |
| 2010/0048242 A1 | 2/2010 | Rhoads et al. | |
| 2010/0138216 A1 | 6/2010 | Tanev | |
| 2010/0161384 A1 | 6/2010 | Wells | |
| 2010/0197390 A1 | 8/2010 | Craig et al. | |
| 2011/0082684 A1 | 4/2011 | Soricut et al. | |
| 2011/0161076 A1* | 6/2011 | Davis et al. | 704/231 |
| 2011/0295591 A1* | 12/2011 | Fang et al. | 704/9 |
| 2012/0109623 A1* | 5/2012 | Dolan et al. | 704/2 |
| 2012/0166175 A1* | 6/2012 | Kopparapu | 704/3 |
| 2014/0019117 A1* | 1/2014 | Ravi et al. | 704/9 |

OTHER PUBLICATIONS

Callison-Burch, et al., "Creating Speech and Language Data With Amazon's Mechanical Turk," retrieved at <<http://citeseerx.ist.psu.edu/viewdoc/download?doi=10.1.1.169.4021&rep=rep1&type=pdf>>, Proceedings of the NAACL HLT 2010 Workshop on Creating Speech and Language Data with Amazon's Mechanical Turk, 2010, 12 pages.

Sarikata, et al., "Iterative Sentence-Pair Extraction from Quasi—Parallel Corpora for Machine Translation," retrieved at <<http://www.cs.columbia.edu/~smaskey/papers/sent_select_mt.pdf, Proceedings of the 10th Annual Conference of the International Speech Communication Association, 2009, pp. 432-435.

O'Hagan, Minako, "Evolution of User-generated Translation: Fansubs, Translation Hacking and Crowdsourcing," retrieved at <<http://pmstrad.com/wp-content/JIAL_2009_1_2009_APA.pdf#page=102>>, The Journal of Internationalisation and Localisation, vol. 1, 2009, pp. 94-121.

Parent, et al., "Clustering dictionary definitions using Amazon Mechanical Turk," retrieved at <<http://www.aclweb.org/anthology-new/W/W10/W10-0703.pdf>>, Proceedings of the NAACL HLT 2010 Workshop on Creating Speech and Language Data with Amazon's Mechanical Turk, pp. 2010, 21-29.

Hu, et al., "Translation by Iterative Collaboration between Monolingual Users," retrieved at <<http://www.cs.umd.edu/hcil/monotrans/publications/hcomp10-changhu.pdf>>, Proceedings of the ACM SIGKDD Workshop on Human Computation, 2010, pp. 54-55.

Budiu, et al., "Parallelizing the Training of the Kinect Body Parts Labeling Algorithm," retrieved at <<http://research.microsoft.com/apps/pubs/default.aspx?id=170877>>, Big Learning: Algorithms, Systems, and Tools for Learning at Scale, Sierra Nevada, Spain, Dec. 16, 2011, 6 pages.

Shotton, et al., "Real-Time Human Pose Recognition in Parts from a Single Depth Image," retrieved at <<http://research.microsoft.com/pubs/145347/BodyPartRecognition.pdf>>, Proceedings of the 2011 IEEE Conference on Computer Vision and Pattern Recognition, 2011, 8 pages.

Rashtchian, et la., "Collecting Image Annotations Using Amazon's Mechanical Turk," retrieved at <<http://acm.org>>, Proceedings of the NAACL HLT 2010 Workshop on Creating Speech and Language Data with Amazon's Mechanical Turk, 2010, pp. 139-147.

Bretaudière, et al., "Associating Automatic Natural Language Processing to Serious Games and Virtual Worlds," retrieved at <<http://hal.inria.fr/docs/00/65/59/80/PDF/Natural_Language_Processing.pdf>>, Journal of Virtual Worlds Research, vol. 4, No. 3, Dec. 2011, 14 pages.

Ambati, et al., "Active Learning and Crowd-Sourcing for Machine Translation," retrieved at <<http://mt-archive.info/LREC-2010-Ambati.pdf>>, Proceedings of the Seventh International Conference on Language Resources and Evaluation, May 2010, 6 pages.

Benotti, et al., "Corpus-based interpretation of instructions in virtual environments," retrieved at <<http://aclweb.org/anthology-new/P/P12/P12-2036.pdf>>, Proceedings of the 50th Annual Meeting of the Association for Computational Linguistics, Jul. 8, 2012, pp. 181-186.

"Natural Language: Understanding & Generating Text & Speech," retrieved at <<http://aitopics.net/NaturalLanguage>>, retrieved on Oct. 12, 2012, Association for the Advancement of Artificial Intelligence, 6 pages.

Wang, et al., "Crowdsourcing the Acquisition of Natural Language Corpora: Methods and Observations," retrieved at <<http://www.cs.cmu.edu/~yww/papers/wang_et_al_SLT2012.pdf>>, retrieved on Oct. 12, 2012, 6 pages.

"Office Action & Search Report Received for Chinese Patent Application No. 201110358464.6", Mailed Date: Jan. 6, 2014, 18 pages.

Auger, Tom, "Crowdsourcing WordPress i18n, Tomauger.com", Published on; Nov. 6, 2012, Available at: http://www.tomauger.com/2012/web-development/wordpress/crowdsourcing-wordpress-i18n, 4 pages.

Bannard, et al., "Paraphrasing with Bilingual Parallel Corpora", In Proceedings of the 43rd Annual Meeting on Association for Computational Linguistics, Jun. 2005, pp. 597-604.

Berg-Kirkpatrick, et al., "Painless Unsupervised Learning with Features", The Annual Conference of the North American Chapter of the Association for Computational Linguistics, Jun. 2010, pp. 582-590.

Buzek, et al., "Error Driven Paraphrase Annotation Using Mechanical Turk", In Proceedings of the NAACL HLT Workshop on Creating Speech and Language Data with Amazon's Mechanical Turk, Jun. 2010, pp. 217-221.

Cancedda, et al., "Corpus-Based Grammar Specialization", In Proceedings of the 2nd Workshop on Learning Language in Logic and the 4th Conference on Computational Natural Language Learning, vol. 7, Sep. 13, 2000, pp. 7-12.

Clark, Alexander, "Unsupervised Induction of Stochastic Context-Free Grammars Using Distributional Clustering", In Proceedings of the Workshop on Computational Natural Language Learning, vol. 7, Jul. 6, 2001, 8 Pages.

Barzilay, Regina, "Extracting Paraphrases from a Parallel Corpus", In Proceedings of the 39th Annual Meeting on Association for Computational Linguistics, Jul. 6, 2001, pp. 50-57.

"Non-final Office Action Issued in U.S. Appl. No. 12/916,951", Mailed Date: Jan. 21, 2014, 18 Pages.

Grishman, et al., "Automated Determination of Sublanguage Syntactic Usage", In Proceedings of the 10th International Conference on Computational Linguistics and 22nd Annual Meeting on Association for Computational Linguistics, Jul. 2, 1984, pp. 96-100.

Keselj, et al., "A Formal Approach to Subgrammar Extraction for NLP", In Journal of Mathematical and Computer Modeling, vol. 45, Issue 3, Feb. 2007, pp. 394-403.

Li, Chi-Ho, "Grammar Learning by Distributional Context", Retrieved on: Oct. 8, 2012, Available at: http://web.archive.org/web/20040914224921/http://www.cs.bham.ac.uk/~mgl/cluk/papers/li.ps, 7 pages.

Marge, et al., "Using the Amazon Mechanical Turk for Transcription of Spoken Language", In IEEE International Conference on Acoustics Speech and Signal Processing, Mar. 2010, pp. 5270-5273.

Marton, et al., "Improved Statistical Machine Translation Using Monolingually-Derived Paraphrases", In Proceedings of the Conference on Empirical Methods in Natural Language Processing, Aug. 7, 2009, pp. 381-390.

Matsuzaki, et al., "Probabilistic CFG with Latent Annotations", In Proceedings of the 43rd Annual Meeting of the Association for Computational Linguistics, Jun. 2005, pp. 75-82.

Mohri, et al., "Regular Approximation of Context-Free Grammars through Transformation", In Robustness in Language and Speech Technology, May 2000, pp. 251-261.

"International Search Report & Written Opinion Issued for PCT Application No. PCT/US2013/072531", Mailed Date: Oct. 16, 2014, 10 Pages.

(56) References Cited

OTHER PUBLICATIONS

"International Search Report & Written Opinion Issued for PCT Application No. PCT/US2014/016339", Mailed Date: Oct. 17, 2014, 16 Pages.

Petrov, et al., "Learning Accurate, Compact, and Interpretable Tree Annotation", In Proceedings of the 21st International Conference on Computational Linguistics and the 44th Annual Meeting of the Association for Computational Linguistics, Jul. 2006, pp. 433-440.

Petrov, et al., "Learning Accurate, Compact, and Interpretable Tree Annotation", Available at: <<http://nlp.cs.berkeley.edu/pubs/Petrov-Barrett-Thibaux-Klein__2006__Learning__slides.ppt>>, Slide Presentation, Retrieved on: Feb. 11, 2013, 38 Pages.

Detlef, Prescher, "Inducing Head-Driven PCFGs with Latent Heads: Refining a Tree-Bank Grammar for Parsing", In Machine Learning: ECML, Springer Berlin Heidelberg, Oct. 2005, pp. 292-304.

Rayner, et al., "Fast Parsing Using Pruning and Grammar Specialization", In Proceedings of the 34th Annual Meeting on Association for Computational Linguistics, Jun. 24, 1996, pp. 223-230.

Resnik, et al., "Improving Translation via Targeted Paraphrasing", In Proceedings of the Conference on Empirical Methods in Natural Language Processing, Oct. 2010, pp. 127-137.

Scanlon, Jessie , Luis von Ahn: The Pioneer of "Human Computation", Available at <<http://www.businessweek.com/stories/2008-11-03/luis-von-ahn-the-pioneer-of-human-computation-businessweek-business-news-stock-market-and-financial-advice>>, Nov. 3, 2008, 15 Pages.

Vondrick, et al., "Efficiently Scaling Up Video Annotation with Crowdsourced Marketplaces", In Proceedings of the 11th European Conference on Computer vision, Springer Berlin Heidelberg, Sep. 5, 2010, 14 Pages.

Weng, et al., "Partitioning Grammars and Composing Parsers", In Proceedings of the 4th International Workshop on Parsing Technologies, Sep. 1995, pp. 1-14.

Wu, Dekai, "Stochastic Inversion Transduction Grammars and Bilingual Parsing of Parallel Corpora", In Journal of Computational Linguistics, vol. 23, Issue 3, Sep. 1997, pp. 377-403.

Zhao, et al., "Robust Active Learning Using Crowdsourced Annotations for Activity Recognition", In Paper from the AAAI Workshop: Human Computation, Aug. 2011, pp. 74-79.

Callison-Burch, et al., "Improved Statistical Machine Translation Using Paraphrases", In Proceedings of the main Conference on Human Language Technology Conference of the North American Chapterof the Association of Computational Linguistics, Jun. 4, 2006, pp. 17-24.

\* cited by examiner

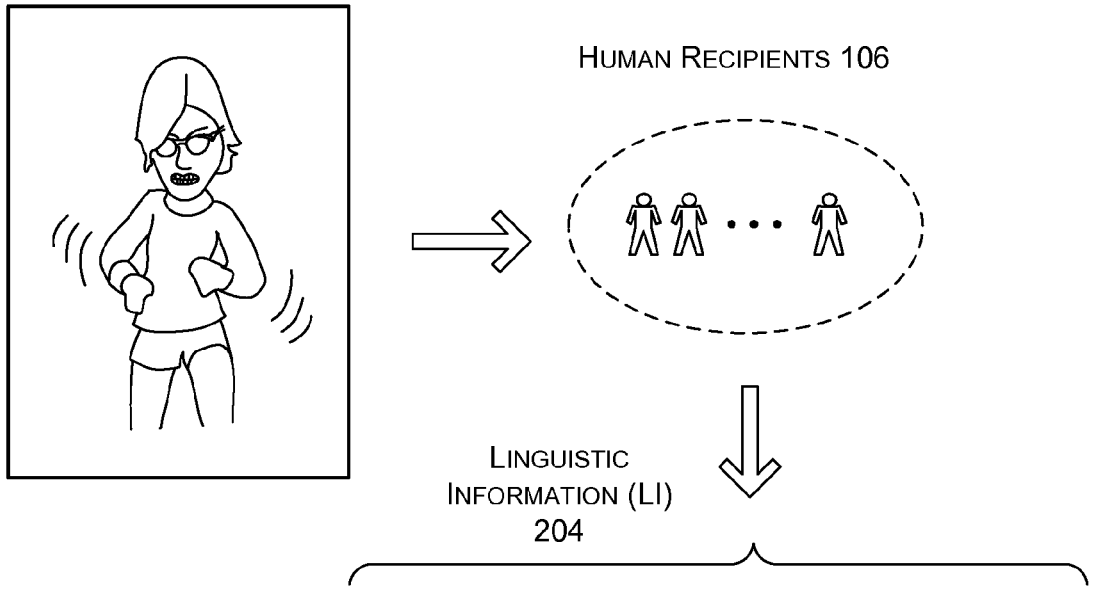

STIMULUS INFORMATION (SI) 202

HUMAN RECIPIENTS 106

LINGUISTIC INFORMATION (LI) 204 bares her teeth and looks confrontational
does not wave, and steps forward
doesn't wave then stomps foot and looks angry
gets mad and steps forward
had angry stance
has a growling face
is acting aggressive
is acting angry
is acting angry
is acting angry
is acting very angry
is angry and unfriendly
is angry looking
is angry, not friendly
is demonstrating aggression
is flexing
is gesturing angrily
is growling and clinching

STIMULUS INFORMATION (SI) 302
 
PART A — PART B
INSTRUCTION: 304 — "Please briefly describe what has changed in the second video, compared to the first video."
LINGUISTIC INFORMATION (LI) 306
She is snarling
Girl bares her teeth
Lady growls, seems really angry
Shows anger by growling
Moves her lips to show teeth
Lady first frowns, and then growls
⋮
FIG. 3

| Principal Character | Action Done Independent of Object | Action Done to Object | Object | Back-ground |
|---|---|---|---|---|
| None<br>Girl<br>Man<br>Dog<br>Rabbit<br>Object X<br>Object Y<br>Object Z<br>⋮ | Jump<br>Run<br>Skip<br>Crawl<br>Dance<br>Sit<br>Stretch<br>Sneeze<br>⋮ | None<br>Kick<br>Punch<br>Dodge<br>Throw<br>Pick up<br>Smash<br>Hug<br>Hold<br>⋮ | Frying Pan<br>Fork<br>Spoon<br>Balloon<br>Ball<br>Coffee Mug<br>Image X<br>Image Y<br>Image Z<br>⋮ | ⋯ |

502

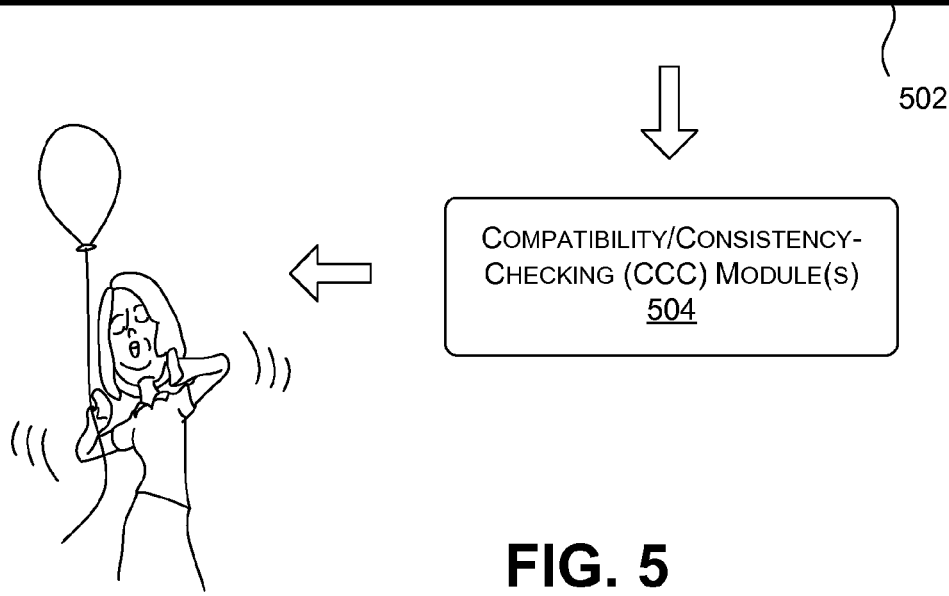

COMPATIBILITY/CONSISTENCY-CHECKING (CCC) MODULE(S)
504

FIG. 5

GENERATING STIMULI FOR USE IN SOLICITING GROUNDED LINGUISTIC INFORMATION

BACKGROUND

Crowdsourcing refers to a general technique for delegating tasks to a relatively large group of people. In some cases, developers have used crowdsourcing techniques to collect linguistic information. To cite merely one such application, a developer may ask a plurality of users to translate information expressed in a source language into a target language. The developer may then compile a parallel corpus based on the responses received from the users. The developer may then use known machine learning techniques to generate a translation model based on the parallel corpus.

The above-summarized kinds of crowdsourcing projects are useful, but are subject to various constraints.

SUMMARY

A processing system is described herein which generates stimulus information (SI) having one or more stimulus components (SCs), selected from an inventory of such SCs. Each SC, in turn, has a nexus to a feature of a target environment, such as a target computer system. For example, a feature may correspond to an object, data item, state, behavior, etc. of a target computer system.

The processing system then presents the SI to a group of human recipients, inviting those recipients to provide linguistic descriptions of the SI in any language or combination of languages. The processing system receives and stores the linguistic descriptions. Those descriptions are collectively referred to herein as linguistic information (LI).

By virtue of the above approach, there is a nexus between the LI that is received and the SCs that compose the SI. And since the SCs are mapped to features of the target environment, there is also a nexus between the LI and the features of the target environment. In this sense, the LI is grounded in features of the target environment.

The above-summarized relationships enable applications to apply the LI in various ways to interact with the target environment. One application, for instance, may leverage the LI to control a target computer system. Another application may leverage the LI to narrate actions that are detected by the target computer system. Still other applications are possible which utilize the LI.

According to another illustrative aspect, the SI may correspond to animated visual SI that is composed of one or more animated visual SCs.

According to another illustrative aspect, the features of a target computer system may correspond to behavior exhibited by a character. In one case, that behavior may correspond to movement that is described using skeletal tracking data.

According to another illustrative aspect, the processing system may display (or otherwise convey) the SI in the context of a challenge-response authentication task, referred to herein as a Human Interactive Proof or HIP. The purpose of the HIP is to test whether input that has been received was generated by a human being (rather than, for example, an automated agent).

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 shows illustrative stimulus information (SI) and a collection of linguistic descriptions provided by a group of human recipients, provided in response to the SI.

FIG. 3 shows another instance of SI. This SI includes two parts.

FIG. 5 shows an inventory of stimulus components (SCs) that the processing system (of FIG. 1) may use to generate the SI.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative processing system for collecting and applying linguistic information. Section B describes illustrative methods which explain the operation of the functionality of Section A. Section C describes illustrative computing functionality that can be used to implement any aspect of the features described in Sections A and B.

This disclosure is related to common-assigned application Ser. No. 12/916,951 (the '951 Application), entitled "Stimulus Description Collections," naming the inventors of Dolan, et al., filed on Nov. 1, 2010. The '951 Application is incorporated herein by reference in its entirety.

Figure 12:
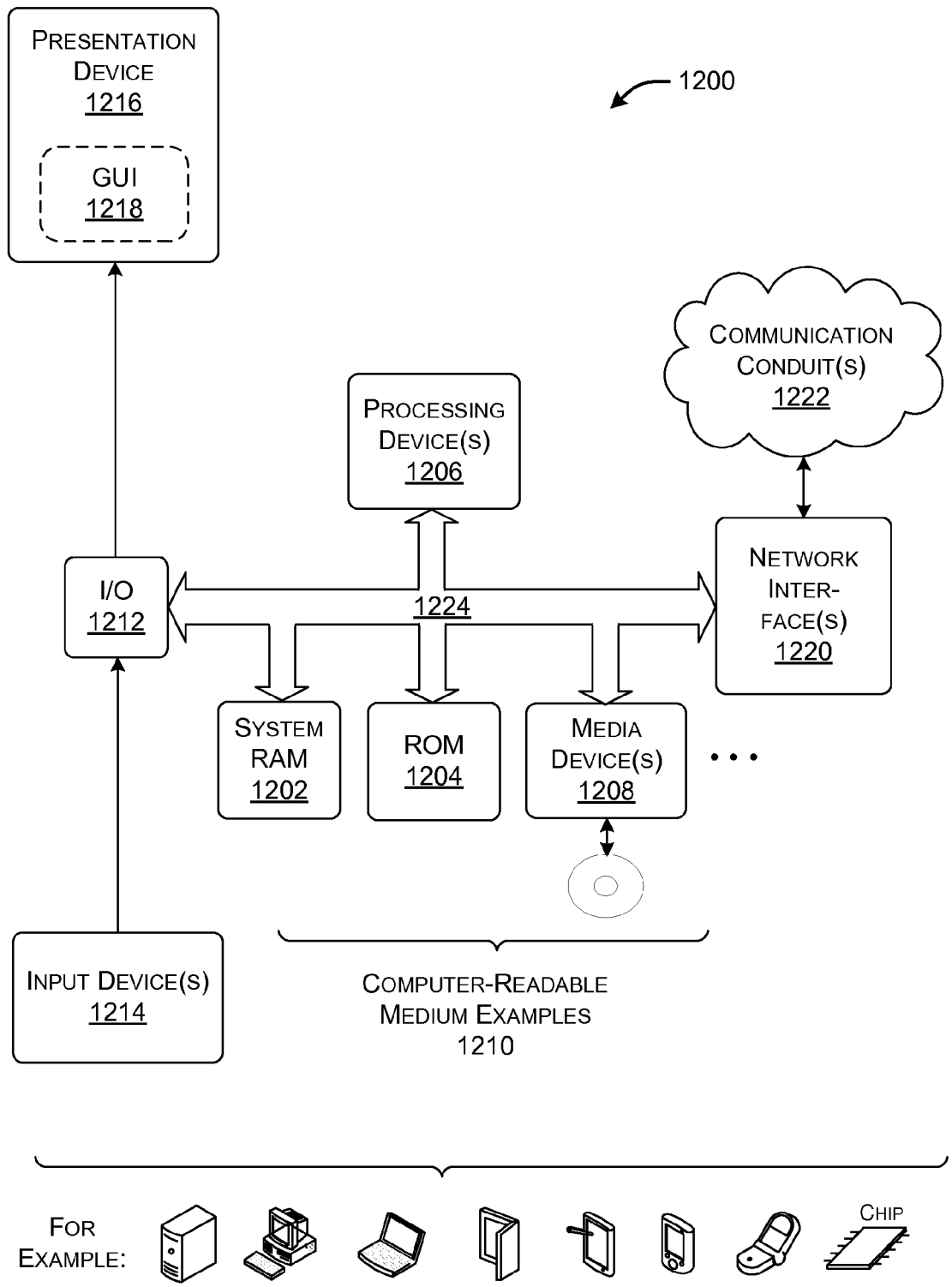
FIG. 12 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
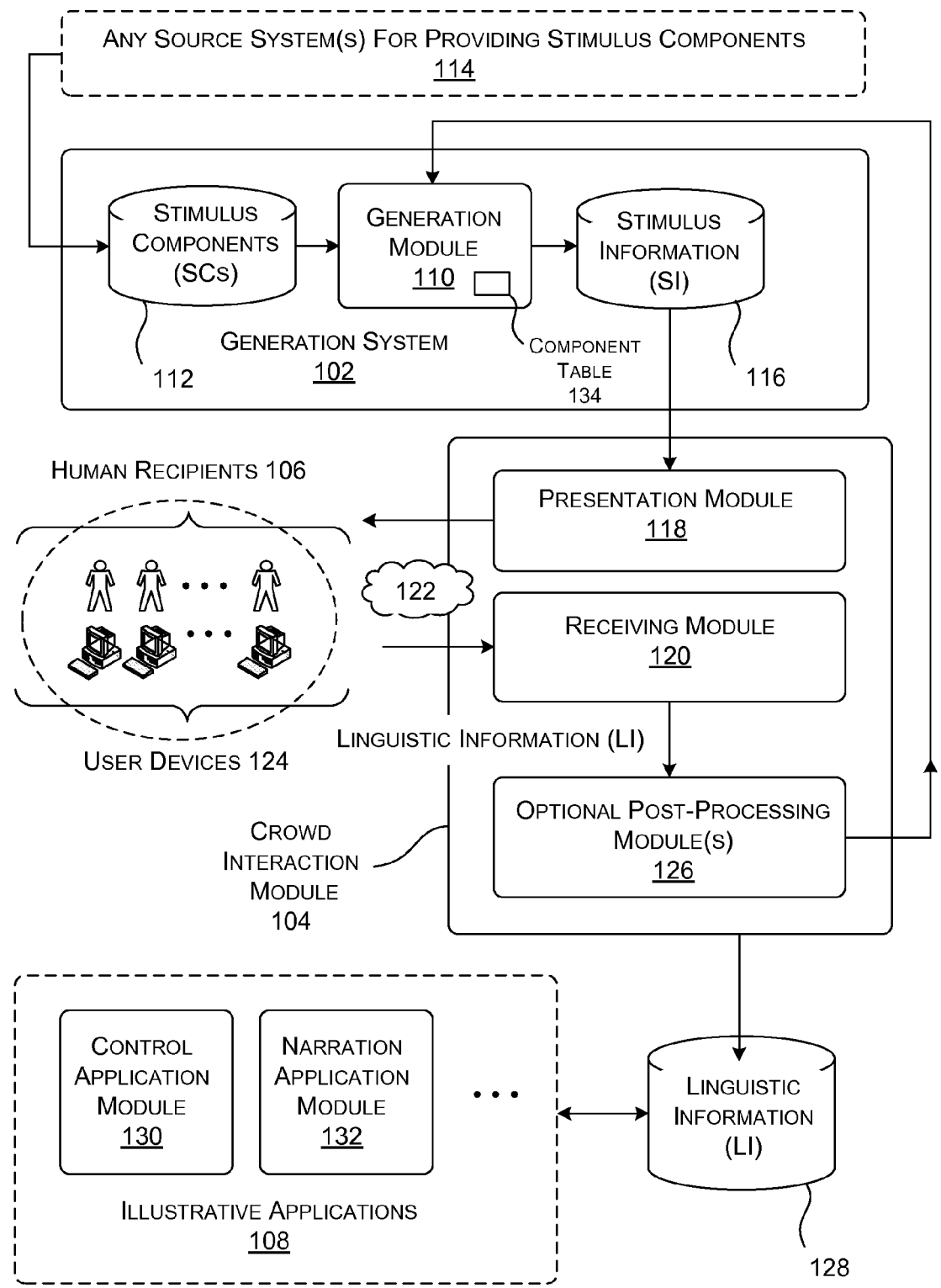
FIG. 1 shows an illustrative processing system for collecting linguistic information (LI) via a crowdsourcing technique, and then leveraging that LI in various applications.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Processing System A.1. Overview of the Processing System FIG. 1 shows an illustrative processing system 100 for collecting and applying linguistic information (LI). The principal components of the processing system 100 include: a generation system 102 for generating stimulus information (SI); a crowd interaction module 104 for presenting the SI to a group of human recipients 106, and, in response, collecting linguistic descriptions offered by the recipients 106; and one or more applications 108 for using the linguistic descriptions to achieve various objectives.

FIG. 1 illustrates the processing system 100 as a single collection of functional components to facilitate explanation. In some cases, the processing system 100 may indeed comprise an integrated collected of functional components associated with a single physical system. But, in general, the functional components shown in FIG. 1 can be implemented by any number of separate physical systems. The separate physical systems can be located at a single site or distributed among two or more sites. The separate physical systems can furthermore be administered by a single entity or administered by two or more entities. For example, a first entity may produce the SI, a second entity may distribute the SI to the group of human recipients 106, and any number of additional entities can apply the resultant LI in various applications.

Each functional component shown in FIG. 1 can be implemented by any type of physical system. For example, in one representative implementation, the generation system 102 and the crowd interaction module 104 can each be implemented by one or more server computers and associated data store(s). In some implementations, these server computers can be accessible via a wide area network (such as the Internet). Any of the applications 108 can be implemented as a server computer (or computers) and associated data store(s). Alternatively, or in addition, any of the applications 108 can be implemented by a local computing device of any type, e.g., a personal computer, a laptop-computer device, a tablet-type computer device, a game console device, a set-top box device, a mobile telephone device (e.g., a smartphone device), a personal digital assistant device, a book reader device, a portable game playing or music playing device, and so on.

This subsection (Subsection A.1) will present an overview of the functional components shown in FIG. 1, explaining the components from a generally top-to-bottom manner. The following subsections will present additional illustrative detail regarding each of the above-identified principal components shown in FIG. 1.

To begin with, the generation system 102 generates SI expressed in any medium or combination of media. In one case, the SI corresponds to an animated visual presentation. In one such instance, the animated visual presentation may correspond to computer-generated information, such as animated cartoon-like information. Alternatively, or in addition, the animated visual presentation may correspond to video information captured using a camera of any type (or types). Alternatively, or in addition, the animated visual presentation graphically depicts the output of an application as it transitions among states. For example, the animated visual presentation may depict the transition between two graphical presentations produced by a spreadsheet program.

In another case, the SI corresponds to a static visual presentation, e.g., a static image or a set of static images (such as a "before" and "after" pair of images). In another case, the SI corresponds to an audio presentation. For example, the SI may correspond to any of: a portion of a song; recorded human speech or other naturally-occurring audible information; a sound effect, etc., or any combination thereof. These examples are cited by way of illustration, not limitation; still other options are possible.

An instance of non-static SI can have any duration. However, it is contemplated that many instances of SI will have durations of a few seconds. In one implementation, the crowd interaction module 104 can play the action of a non-static SI in a loop.

To be more concrete, FIG. 2 shows an example of animated visual SI 202. This SI 202 shows a cartoon-like female character which performs an action that takes a few seconds to complete. In this merely representative case, the character exhibits behavior that conveys anger, e.g., by clenching its fists, baring its teeth, and stepping forward. The crowd interaction module 104 presents the SI 202 to the human recipients 106, inviting those recipients 106 to describe the action that is taking place in the SI 202. Each recipient may respond by offering a linguistic description of the SI 202 in a natural language. As used herein, a natural language (or simply "language") refers to any system of expression by which two or more human beings may communicate with each other. Without limitation, a language encompasses commonly-spoken languages, such as English, French, Chinese, etc. A language also encompasses fictional or artificial languages, such as Esperanto. A language also encompasses non-spoken forms of communication, such as sign language, gestural communication, body language, etc.

Since each recipient works independently of the other recipients, there will likely be variation in the linguistic descriptions that are received. However, since the recipients 106 are viewing the same SI, the collection of linguistic descriptions will also likely include groupings of closely-related or identical linguistic descriptions. Illustrative linguistic descriptions for the SI 202 shown in FIG. 2 may include: (1) "had an angry stance"; (2) "has a growling face"; and (3) "is acting aggressive," and so on. Although the linguistic descriptions that are listed in FIG. 2 correspond to phrases in the English language, the linguistic descriptions can be expressed in any language or combination of languages. As used herein, the collection of linguistic descriptions, as well as any subset of this collection, is referred to herein as linguistic information (LI) 204.

More specifically, as used herein, the term linguistic description (or just "description") refers to any annotation of an instance of SI provided by a human recipient in any language or combination of languages. The annotation is a description insofar that, from the perspective of the processing system 100, it can be used to characterize the instance of SI. In some cases, the recipient enters a description with the express intent of explaining what he or she sees, or otherwise senses. FIG. 2 presents just such an example. In other cases, the recipient enters information with other intent, and that information is treated, by the processing system 100, as a description. For example, a recipient can react to an instance of SI by: (a) posing a question (e.g., "Why did the woman get angry?"); (b) formulating a command that would have the effect of producing the action in the SI (e.g., "Stomp your feet and grimace"); (c) expressing an evaluation (e.g., "The lady was wrong to get upset"); (d) expressing a personal reaction (e.g., "This makes me upset too"); (e) expressing a suggestion (e.g., "She should try to calm down"), and so on. All such non-limiting modes of expression constitute examples of descriptions, as that term is used herein. The processing system 100 can influence the nature of the responses it receives by virtue of the kind of instruction that it presents to the recipients, as in "Explain what you see," verses "How does this make you feel?".

In the above example, the generation system 102 produces SI having a single intended focus of attention. In other cases, the generation system 102 may produce SI that invites the recipients to compare two or more parts of the SI. For example, the generation system 102 can produce side-by-side videos which differ from each other in one or more ways. For example, the generation system 102 can produce side-by-side videos of the same character, where the character performs an action in the second video that is not performed in the first video. Or an object may be present in the second video that is not present in the first video. The crowd interaction module 104 may then instruct the recipients 106 to describe the difference(s) between the two videos. Still other examples of SI are possible. The same manner of soliciting comparisons can be applied to static images, audio information, etc.

For example, FIG. 3 shows SI 302 that includes two parts, i.e., Part A and Part B. Both parts depict an animated character performing an action. More specifically, the character performs the same action in both parts, with the exception that the character bares her teeth in Part B, but not in Part A. An instruction 304 can invite a user to identify the difference between the parts, e.g., by prompting: "Please briefly describe what has changed in the second video, compared to the first video." The LI 306 that is collected in response to this instruction 304 can be expected to narrowly focus on the teeth-baring action. Hence, the SI 302 shown in FIG. 3 is an effective vehicle to train the user's focus on particular aspects of an instance of SI. Alternatively, or in addition, the difference between Part A and Part B may pertain to the existence or non-existence of an object or objects. For example, the character may be holding a different object in Part B, relative to Part A (not shown in FIG. 2).

Returning to FIG. 1, the generation system 102 produces the SI using a generation module 110. The generation module 110, in turn, builds the SI by selecting one or more parts provided in a data store 112. Each part is referred to herein as a stimulus component (SC), and the collection of parts is referred to as an inventory of SCs. The SCs may also be regarded as templates. Possible types of SCs include, but are not limited to: video snippets; audio snippets; programmatic descriptions of poses or actions; images; graphical models, parameter settings; programmatic states, texture information, and so on.

For example, consider an instance of SI that shows an old man throwing a dish beside a dining table. A first SC that contributes to the SI may produce a principal character in the form of an old man. A second SC may produce an object that the old man manipulates is a dish. A third SC may create the action performed by the old man as an act of throwing. Still other options are possible, as will be clarified below in Sub-section A.2.

There is a nexus between each SC and some feature of a target environment. In this sense, the LI, the SI, and the SCs can be regarded as "grounded" in the target environment. The target environment may correspond to any real-world setting. For example, the target environment may correspond to a target computer system that performs some type of computing function based on an application. In one context, the target computer system may use the LI to control various aspects of its operation. In another context, the target computer system may use the LI to narrate actions that it detects. In other cases, the target environment may correspond to a physical environment that is populated with various tangible objects. For example, the target environment may correspond to a product assembly line.

The features of a target environment refer to any aspect of the target environment. For example, a feature of a target computer system may include one or more of: an object created by software running on the target computer system; a data item maintained or otherwise associated with the target computer system; a state that may be achieved by the target computer system; a behavior performed or detectable by the target computer system, and so on. In many cases, these kinds of features may ultimately map back to respective portions of computer code provided by the target computer system.

The term behavior itself has broad connotation as used herein. For example, a feature of the target computer system may describe the manner in which it can transition from any first programmatic state to a second programmatic state. For example, a feature of the target computer system may describe a particular type of movement of a character that is executable and/or detectable by the target computer system. The movement of such a character can be described as a sequence of poses. In one case, the target computer system can express each pose using skeletal tracking data.

A feature of a physical target environment may alternatively, or in addition, correspond to a tangible object within the target environment, a physical process or event within the target environment, and so on.

Any source system 114 may provide the SCs, and/or can produce information that is otherwise associated with the SCs. For example, one type of source system 114 creates information that describes different movements. This type of source system 114 can describe movements in any manner, such as using skeletal tracking data. In one case, the source system 114 can automatically learn these movements by analyzing the movements of actual human (and/or non-human) subjects.

In another case, the source system 114 may rely on an administrator to manually create different snippets of code, data items, etc. which produce different kinds of objects, actions, etc. Alternatively, or in addition, an administrator can use a recording device to capture images, video snippets, audio snippets, etc. that depict different objects, actions, etc. The administrator can also optionally label these captured items with descriptive metadata of any type. The SC-creation techniques are cited by way of illustration, not limitation; still other SC-creation techniques are possible.

The generation module 110 can optionally store the instances of SI that it produces in a data store 116. For example, the crowd interaction module 104 may distribute a relatively large number of new instances of SI to the recipients 106 on a periodic basis, an event-driven basis, and/or any other basis. To meet this need, the generation module 110 can produce a collection of instances of SI on a batch-driven basis (e.g., at a particular time of the day), and/or on a continuous basis, or some combination thereof The generation module 110 can store those instances of SI in the data store 116 prior to their dissemination by the crowd interaction module 104.

The crowd interaction module 104 can use a presentation module 118 for distributing the instances of SI to the recipients 106. As described above, the crowd interaction module 104 may invite the recipients 106 to provide descriptions in any manner and in any language(s). For example, the crowd interaction module 104 may instruct the recipients 106 to "Describe the action that is taking place in the video." In other cases, the crowd interaction module 104 may instruct the recipients 106 to express a command which, if carried out by the character shown in the SI 202, will duplicate the action that is shown in the SI 202. That is, for example, the crowd interaction module 104 may instruct the recipients 106 to "Provide a command which will cause the character to perform the action that is illustrated here." In other cases, the crowd interaction module 104 can solicit the kind of comparative descriptions shown in FIG. 3. In other cases, the crowd interaction module 104 can solicit responses in a more open-ended manner, e.g., by instructing, "Enter a response to this video." The crowd interaction module 104 can then use a receiving module 120 to collect the linguistic descriptions provided by the recipients 120.

The crowd interaction module 104 can use any mechanisms to perform the above-described tasks. For example, in one case, the presentation module 118 can send the instances of the SI to the recipients 106 via any type of network 122, such as a wide area network (e.g., the Internet). More specifically, the presentation module 118 module can use a push-based technique and/or a pull-based technique to distribute the instances of SI. Each of the recipients 106 can use any type of user device to present instances of SI. Illustrative types of user devices 124 include personal computers, laptop computers, tablet-type computers, mobile telephones (e.g., smartphones), personal digital assistant devices, book reader devices, etc. The recipients 106 can then use the user devices 124 to send the linguistic descriptions to the receiving module 120 via the network 122.

In other cases, one or more aspects of the generation system 102 and/or the crowd interaction module 104 can be implemented by each user device. For example, a local user device can include a local instantiation the generation system 102 which generates one or more instances of SI. A local instantiation of the presentation module 118 can then present the SI to a recipient which operates the local device.

An administrator may ask the recipients 106 to offer linguistic descriptions using any kind of crowdsourcing technique or paradigm. In a first technique, an administrator offers the recipients 106 a fee to participate in the crowdsourcing project. In a second context, the administrator may invite the recipients 106 to contribute to the crowdsourcing project without receiving payment. For example, the crowd interaction module 104 can couple the crowdsourcing task with some other function that the recipients 106 wish to perform for some independent reason. The crowd interaction module 104 can thereby collect LI in the course of the recipients' execution of the other function. Subsection A.3 provides additional details regarding different crowdsourcing techniques that may be used to collect LI.

An optional post-processing module 126 can perform analysis on the LI to improve its quality. For example, an instance of LI ideally maps back to a single SC in an unambiguous manner. And that SC maps back to a particular feature of the target environment. But the LI may also include noise that reflects eccentric linguistic descriptions provided by some of the recipients 106. For example, most of the recipients 106 can be expected to offer linguistic descriptions which focus on an intended principal theme of an instance of SI. But other recipients may, for whatever reason, provide linguistic descriptions that focus on tangential features of the SI. The post-processing module 126 can remove these errant descriptions using any one or more of a number of different techniques. For example, the post-processing module 126 can use a clustering technique to distinguish between a predominant focus of interest and more tangential focuses of interest in the linguistic descriptions. Alternatively, or in addition, the post-processing module 126 can use a paraphrasing model to produce one more paraphrases of the information expressed by the collection of linguistic descriptions. This may produce one or more canonical representations of a set of linguistic descriptions.

The post-processing module 126 can also work in cooperation with the generation module 110 to produce SI that targets particular features of the target system. For example, the generation module 110 can produce an instance of SI with the intent of targeting a particular SC, such as an SC associated with a jumping action. The post-processing module 126 can analyze the resultant LI to determine whether the linguistic descriptions that have been collected do indeed converge on a single focal point. If not, the post-processing module 126 can communicate its conclusions to the generation module 110. The generation module 110 can then produce one or more new SIs with the objective of more effectively pinpointing the desired focus of interest.

The crowd interaction module 104 can store the LI that it collects in a data store 128. That LI may comprise the raw list of linguistic descriptions provided by the receiving module 120 and/or the processed information produced by the post-processing module 126.

A wide variety of applications 108 may consume the LI. For example, a control application module 130 may receive LI from a user or other entity. The control application module 130 may then use the LI to control some aspect of a target computer system. In contrast, a narration application module 132 may detect some behavior exhibited by the target computer system or observed by the target computer system, and then retrieve LI associated that behavior. The narration application module 132 can then annotate the behavior with the LI. Subsection A.4 provides additional details regarding different applications of the LI.

Figure 4:
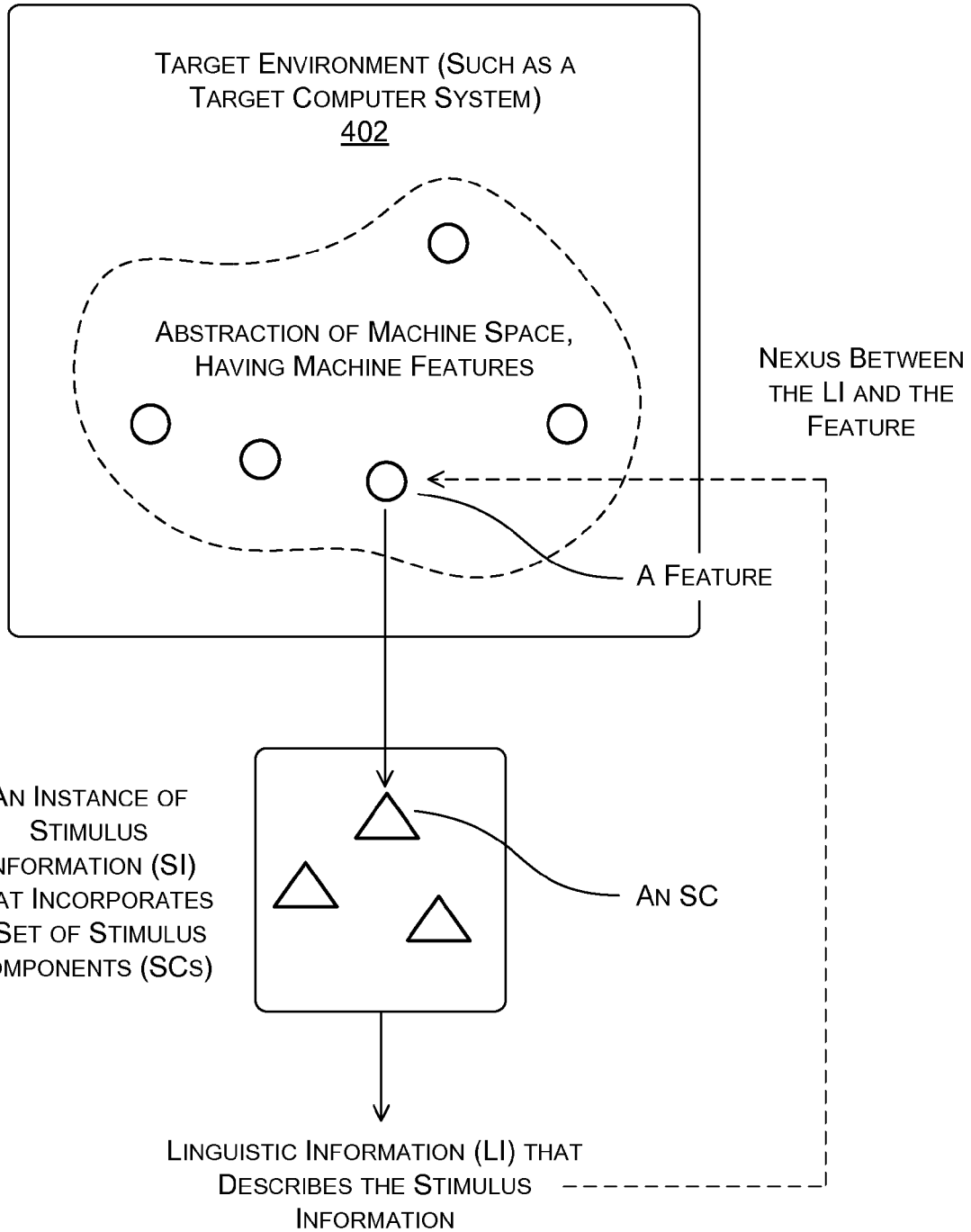
FIG. 4 is a conceptual diagram which illustrates the nexus between LI collected via the crowdsourcing technique and features of a target environment.

FIG. 4 summarizes some of the principles set forth in this introductory subsection. As indicated in that figure, a target environment 402 incorporates a set of features. In one case, the target environment 402 may correspond to a target computer system that performs a computing function. The target computer system can be abstractly modeled as a machine space having a set of features that contribute to its operation. As noted above, the features may include any of objects, data items, behaviors, states, etc. In another case, the target environment 402 may correspond to a physical environment that is populated with tangible objects, processes, events, etc.

An instance of SI incorporates one or more SCs. Each SC links to a corresponding feature of the target environment 402. For example, an SC may correspond to an action that is detectable and/or executable in the target environment 402 (e.g., that is expressible using skeletal tracking data or using some other data), an object in the target environment 402, a state of the target environment 402, and so forth.

An instance of LI describes the SI. Further presume that the LI emphasizes a particular SC within the SI. For example, the LI may focus on the action, object, or state expressed by the SI, which corresponds to a particular SC. In this case, there is a link between the LI and the SC, which, in turn, links back to a particular feature of the target environment 402. An application can leverage this relationship in various powerful ways, many of which are set forth in Subsection A.4 below.

In contrast, other crowdsourcing applications, such as that summarized in the Background section, may restrict their analysis to discovering internal relations within the LI itself. This type of analysis, while useful, does not provide the type of "hook" between the LI and the real world. Hence, this type of framework lacks the ability to interact and/or integrate with physical target systems in the manner summarized in FIG. 4.

A.2. The Generation System

The generation module 110 (of FIG. 1) may store or otherwise have access to a component table 134. That table 134 may parametrically identify the collection of SCs that are available for use in constructing an instance of SI. For example, FIG. 4 shows a component table 502 which parametrically describes different SCs that may be used to construct an instance of animated visual SI. The example of SI shown in FIG. 5 corresponds to a cartoon-like depiction of a woman who is stretching and yawning, while holding a balloon.

The component table 502 may organize the SCs into different environment-specific categories. For example, to cite merely one representative environment, a first column identifies different types of principal characters that may appear in the SI. A second column identifies different types of actions that the principal character may perform, independent of any object that the principal character may be manipulating. A third column may identify different actions performed by the character to an object that the character is manipulating. A fourth column may identify different types of objects that the principal character may manipulate. A fifth column may identify a background context in which the above-stated behavior may be performed. To emphasize once again, this categorization of options is merely one way of discretizing action taking place in an instance of SI. One factor that may influence the manner in which SCs are categorized is the nature of the SCs themselves.

In this non-limiting example, some of the SCs identified in the component table 502 correspond to behaviors (e.g., jumping, running, skipping, etc.). These SCs can be expressed in any form, such as skeletal tracking data. Other SCs pertain to objects. These SCs can also be expressed in any form, such as graphical model information, texture information, images, and so on. For example, the object of "Man" may correspond to a mesh that describes a three-dimensional human figure, together with a texture that is "pasted" onto the mesh. One way that the generation module 110 can change a character is by changing the texture that is applied to the character's mesh. For example, another column of the component table 502 (not shown) could identify different attire that the character is wearing; each such attire corresponds to a different texture that can be "pasted" onto the same graphical model.

The component table 502 may identify any number of SCs. In one environment, an administrator of a crowdsourcing project may seek to obfuscate the manner by which instances of SI are being generated. The administrator can achieve this objective by building a component table having a suitably large number of options, because a suitably large number of options will yield a very large number of possible combinations of options. This large number will make it difficult for a malicious entity to guess the full set of possible combinations of SCs. What is considered "suitably large" will depend on the particular characteristics of each environment in which the processing system 100 is deployed, such as the nature of the threats within that environment.

In many cases, the SCs identified in the table have a descriptive label associated therewith. For example, the SC that corresponds to the action of jumping has the label "jump" associated therewith. In other cases, the semantic content of the SC may not be known a priori. For example, a type of SC in the fourth column has the label "Image X" associated with it. This label indicates that the SC corresponds to an image of an object, but that object has not been given a semantically meaningful label (and may possibly never receive a label). For example, the Image X may correspond to an image of a pen, but this knowledge is not yet reflected in the component table 502.

The generation module 110 can use any technique to select options from the component table 502. For example, the generation module 110 can randomly select one option from each column to create the SI. In another case, the generation module 110 can select two or more options from any one column. For example, the generation module 110 has selected an option having the label "stretch" for the particular instance of SI being created in FIG. 5; but the generation module 110 could have selected two options, corresponding to "stretch" and "yawn" (not shown).

A compatibility/consistency-checking (CCC) module 504 provides rules which govern the combination of SCs that can be "legally" selected. For example, assume that the generation module 110 chooses to make the principal character perform the act of running The CCC module 504 may seek to exclude any action in the third column which is inconsistent with the running behavior. For example, the CCC module 504 may prevent a running subject from hugging a stationary object, since this is a logically inconsistent combination. The rules of the CCC module 504 are implementation-specific, meaning that they may vary based on the nature of the component table under consideration and the nature of the SCs specified therein.

Instead of, or in addition to, randomly selecting SCs, the generation module 110 can systematically select different permutations of options based on any selection plan, to thereby carry out any data collection regimen. For example, the generation module 110 can produce instances of SI with the intent of isolating a particular SC, such as an SC which corresponding to a kicking motion. To accomplish this goal, the generation module 110 can produce multiple instances of SI showing different characters performing a kicking movement. The post-processing module 126 can then analyze all of the instances of LI produced by this series of SIs to attempt to identify the phrases that target the concept of kicking The post-processing module 126 can perform task by identifying the phraseology which appears to be constant for all of the instances of LI that are collected. For example, the post-processing module 126 can use a clustering technique to perform this task.

Alternatively, or in addition, the generation module 110 can produce a first instance of SI that does not include the behavior of kicking. The generation module 110 can then produce a second instance of SI that includes the action of kicking, but otherwise retains all of the other aspects of the first instance of SI. The processing system 100 can then collect two instances of LI, for the first and second instances of SI. The post-processing module 126 can then identify the phraseology in the second instance of LI which differs from the first instance of LI; it is likely that this divergent phraseology will describe the motion of kicking.

Alternatively, or in addition, the generation module 110 can create an SI that contains two or more parts, as shown in FIG. 3. The crowd interaction module 104 may then invite the recipients 106 to comment on what is different (or the same) among the parts. Assume that what is different (or the same) is the action of kicking This type of SI, together with an appropriately tailored instruction, may help focus the recipients' attention on a particular aspect of the SI, such as the action of kicking The processing system 100 can use still other strategies and combinations of strategies to map linguistic expressions to particular SCs.

Alternatively, or in addition, the generation module 110 can select different permutations of options in an adaptive manner, e.g., based on the nature of the LI that has been collected. For example, as noted in Subsection A.1, the generation module 110 may work in cooperation with the post-processing module 126 to help associate linguistic content with SCs. For instance, the post-processing module 126 may produce a confidence score which indicates the probability that an instance of LI corresponds to a particular SC. Based on this confidence score, the generation module 110 can determine whether it is desirable to solicit additional linguistic descriptions aimed at a particular behavior, state, object, etc. In one case, a clustering technique may produce such confidence scores which reflect the certainty associated with the clusters it has identified.

The generation module 110 can also send instructions to the post-processing module 126. These instructions may configure the post-processing module 126 to perform a particular kind of analysis on linguistic information to achieve any environment-specific objective. Further, the generation module 110 and/or the post-processing module 126 can send instructions to the presentation module 118. These instructions may specify the text of the instructions that the presentation module 118 sends to the recipients 106 along with the SI.

In many of the examples presented above, the generation module 110 operates in a fully or mostly automated manner to produce an instance of SI. In other cases, a user may interact with the generation module 110 to produce an instance of SI in a more free-form and user-controlled manner. For example, the user may act as a director of a video by manually instructing the generation module 110 to express certain kinds of action(s), certain kinds of objects, etc. To function in this manner, the generation module 110 may incorporate a human-to-machine interface of any type (such as a voice recognition mechanism, etc.) and a mapping mechanism (such as a lookup table, etc.). The human-to-machine interface receives the commands of the user who is "directing" the content of the SI being created. The mapping mechanism maps the user's instructions to SI-creation actions that will carry out the user's instructions. In yet other cases, a user can produce an instance of SI in a fully manual manner, e.g., by manually picking options from a component table. Still other options are possible for producing an instance of SI.

Likewise, the processing system 100 can be employed in a number of different contexts. In one context, assume that a developer is producing an application that will leverage LI in some way. The developer can use the system 100 to produce that LI in the course of developing the application, before deploying the application. Alternatively, or in addition, the processing system 100 can collect new LI as the application is being used by end users. For example, the developer may note that the users are interacting with the application in a manner not previously anticipated, or that certain aspects of the application appear to be more impactful in characterizing the operation of the application than previously anticipated, etc. In response, the developer can instruct the processing system 100 to collect LI which pertains to the new insight regarding the application, which ultimately maps back to some feature or features of the application. In other cases, the application itself (or some other entity) can automatically make a determination that it is appropriate to collect new LI, e.g., based on the manner in which the users are interacting with the application and/or other factors. Generally, in this manner, some controlling agent or agents can direct the processing system 100 to collect LI in an on-demand manner, to address, in real time or near real time, a circumstance that is presently unfolding. This mode of operation may be particularly useful for those applications that have a highly adaptive and dynamic manner of operation.

Figure 6:
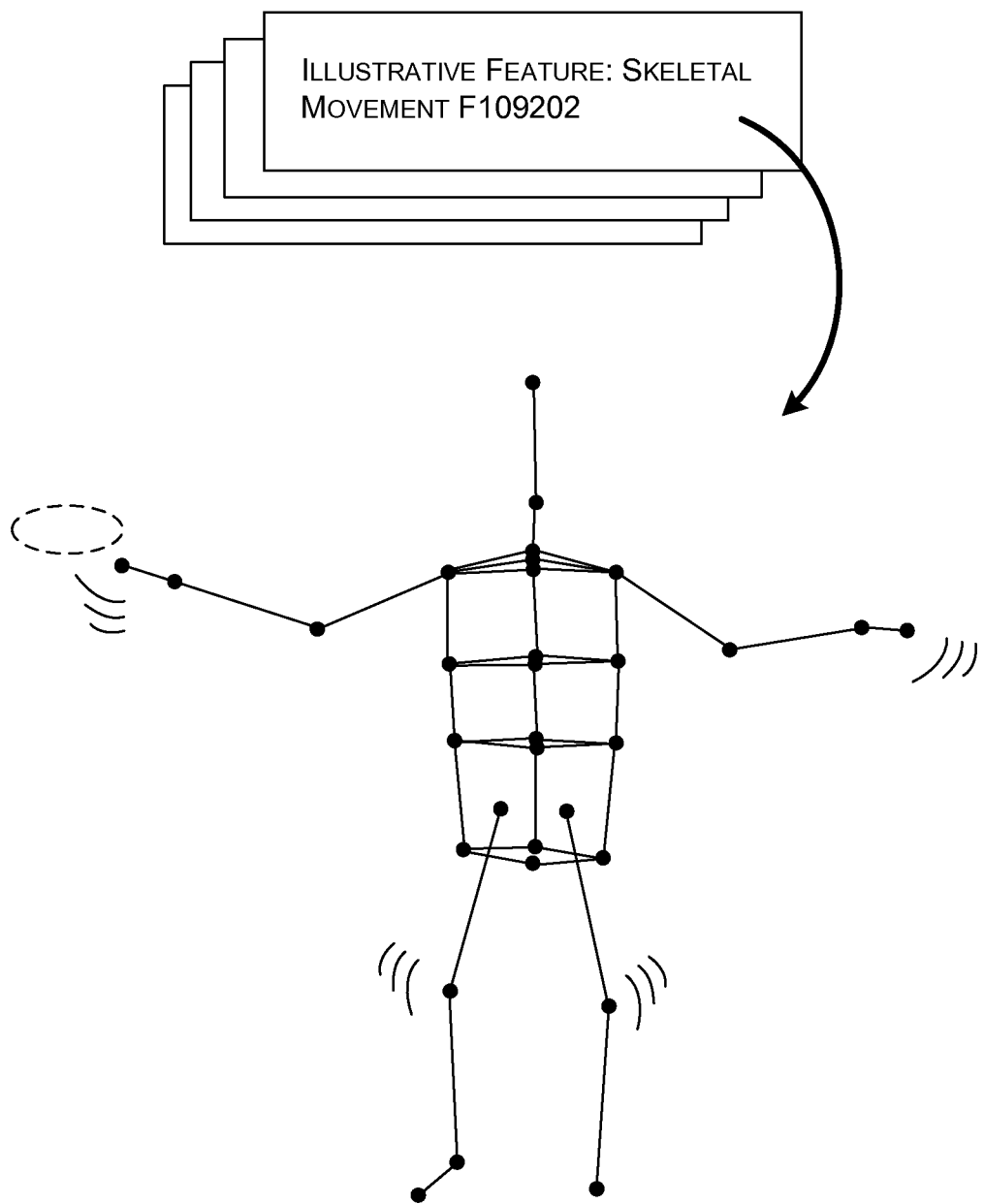
FIG. 6 shows an example in which the features of a target computer system are expressed using skeletal tracking data.

Advancing to FIG. 6, this figure graphically depicts one manner by which an SC can describe the movement of a character. In this case, the movement corresponds to the movement of a human or human-like character. In this case, the SC expresses the movement as a sequence of poses that the character performs to execute the movement. Or the SC is otherwise linked to an expression of the movement in this form. The SC expresses each pose, in turn, using skeletal tracking data, or the SC is otherwise linked to that data. As the name suggests, the skeletal tracking data describes a pose as a collection of joints and line segments which couple the joints together.

The source system 114 (of FIG. 1) can generate an inventory of such SCs that describe different respective movements. For example, the source system 114 may correspond to a training system that produces image data that captures the movements of actual human subjects. The training system can then use known machine learning techniques to produce skeletal tracking data based on the image data. See, for instance, Budiu, et al., "Parallelizing the Training of the Kinect Body Parts Labeling Algorithm," *Big Learning: Algo-*

*rithms, Systems, and Tools for Learning at Scale*, Sierra Nevada, Spain, Dec. 16, 2011.

In addition, the source system 114 can create SCs that incorporate or otherwise relate to image recognition results. For example, the source system 114 may correspond to a training system that produces image data that captures different objects. The training system can then use known object recognition techniques to produce image recognition results (such as pattern information, etc.) which characterize the objects in the images. In the context of FIG. 5, one SC may provide or otherwise link to image recognition results which describe a balloon, while a second SC may provide or otherwise link to image recognition results which describe a ball, and so on.

A.3. The Crowd Interaction Module

The crowd interaction module 104 can use different crowd-sourcing techniques to solicit linguistic descriptions from the recipients 106. In a first technique, for instance, the crowd interaction module 104 can use a pre-established platform that is dedicated to crowdsourcing to collect linguistic descriptions. For example, the crowd interaction module 104 can use the Amazon Mechanical Turk platform provided by Amazon.com of Seattle, Wash. As stated above, the recipients 106 may receive payment for their work (and/or some other form of reward), or may be expected to provide their services for free.

In a second technique, the crowd interaction module 104 can use a search system to collect the linguistic descriptions. For example, the search system may present an instance of SI to a user and then rely on the user to input a key phrase to obtain additional information regarding the SI. The crowd interaction module 104 can collect these phrases as a form of LI.

In a third technique, the crowd interaction module 104 can use a game playing platform to collect the linguistic descriptions. For example, the game playing platform can ask the user to instruct a character to perform various actions. The crowd interaction module 104 can collect these commands as a form of LI.

Still other possible platforms for collecting linguistic descriptions include: social network applications (such as Facebook provided by Facebook, Inc. of Menlo Park, Calif., Twitter provided by Twitter Inc. of San Francisco, Calif., etc.); communication mechanisms (such as instant messaging applications, mobile telephone applications, Skype™ provided by Microsoft Corporation of Redmond, Washington, etc.); collaborative and/or volunteer-based applications (such as Wikipedia, etc.), and so on.

Figure 7:
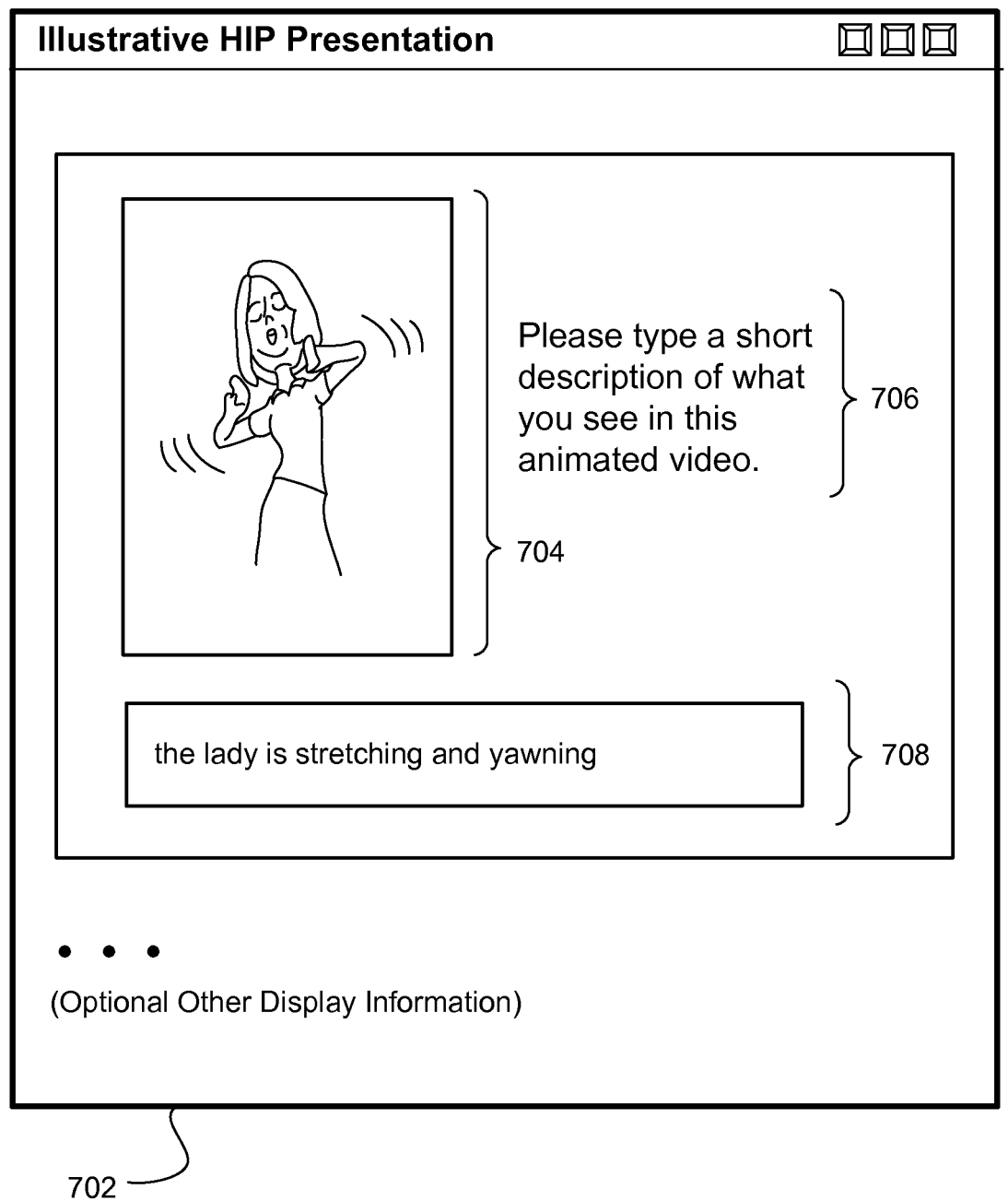
FIG. 7 shows an illustrative Human Interactive Proof (HIP) presentation that the processing system may use to convey the SI to the recipients.

In a fourth technique, the crowd interaction module 104 can present instances of SI within a challenge-response authentication task, referred to herein as a Human Interactive Proof (HIP) task. FIG. 7 shows an example of a HIP presentation 702 that incorporates SI 704 produced by the generation system 102. In this case, the SI 704 corresponds to a cartoon-like animation of a woman stretching and yawning. The HIP presentation 702 may include text 706 and/or audio information that instruct the recipient to enter a linguistic description of the SI 704. The HIP presentation 702 may also include an input mechanism 708 for receiving the recipient's description.

The content and organization of features shown in FIG. 7 is merely illustrative. In other cases, the HIP presentation 702 may include an instance of SI that is expressed in a different medium compared to that which is shown in FIG. 7, such as audio SI, or static image SI, or combination thereof Alternatively, or in addition, the HIP presentation 702 may present an instance of SI that contains two or more parts (as in FIG. 3). The HIP presentation 702 may then invite the user to characterize the difference or similarity among the parts. Alternatively, or in addition, the HIP presentation 702 may present two or more distinct instances of SI. The HIP presentation 702 may then ask the user to provide separate descriptions of each instance of SI. Alternatively, or in addition, the HIP presentation 702 can present an instance of SI with a conventional textual CAPTCHA presentation or the like. The HIP presentation 702 may then ask the user to enter a description of the action in the SI, and also enter the textual phrase displayed in the CAPTCHA presentation. Still other variations are possible.

A system (not shown) may process the LI received via the HIP presentation 702 in any manner. For example, the system may use any type of scoring function to determine whether a linguistic description provided by a user corresponds to input provided by a human or a robot. Here, the term robot corresponds to any automated agent that submits a linguistic description. If the system determines that the input originates from a human, it will allow the user to gain access to the resources of the system. Otherwise, the system will prevent the entity which has submitted the linguistic description from gaining entry to the system. In one case, the scoring function may determine whether the LI includes predetermined keywords and/or possesses other characteristics which indicate that it originates from a human, rather than a robot.

The above-described HIP-related application is an example of a context in which an administrator will wish to obfuscate the manner by which the generation module 110 produces the SI. This will reduce the risk that an automated agent can be deployed to successfully guess the semantic content of the SI. As noted above, one way to stymie this kind of attack is to produce instances of SI using a component table having a suitably large number of options.

A.4. Illustrative Applications

Many of the applications 108 that use the LI can be classified into two categories: control and narration. More specifically, the control application module 130 receives LI as a given input. It then performs an action in a target system based on the LI, e.g., by operating on whatever feature(s) is/are associated with the LI. In contrast, the narration application module 132 receives behavior that is detected by the target system, e.g., corresponding to action that is either performed by the target system or observed by the target system. The narration application module 132 then retrieves LI associated with this behavior, if it exists. The narration application module 132 then performs some operation based on the retrieved LI.

Particular examples of control-type applications and narration-type applications are described below.

Controlling a game or other computer application. In a first application, a user provides commands while playing a game. One such illustrative command might be: "raise sword." The user can provide this command using a voice input mechanism, a key input mechanism, and/or any other form of input mechanism(s). The application will determine whether this command corresponds to a recognizable instance of LI. If so, the application will perform whatever behavior is associated with the LI. For instance, the game application can instruct the character that is being controlled by the user to raise its sword. In one case, each instance of LI may correspond to a sequence of poses, which, in turn, may be expressed using skeletal tracking data. In the terminology set forth above, that sequence corresponds to a feature of the target computer system which runs the application.

In a similar manner, a user can use linguistic commands to control any other application to perform any type of action.

For example, the user may issue a command which instructs a spreadsheet application to transition from one graphical presentation to another graphical presentation. In another case, the user may issue a command which instructs a word processing application to display text in a particular font. Here, the behavior corresponds to transitioning from a first display state to a second display state.

In other cases, the user may input an instance of LI that identifies an object. For example, the user may speak the word "sword" in the above game context. The application will associate the word "sword" with a corresponding feature in the application. For example, the application can express that feature as a three-dimensional object, together with texture information. The application can then cause a character to pick up the designated object (for example). Many other control-related applications are possible.

Controlling a robot. In a second application, a user may provide a command which instructs a physical robot to perform an action. The robot may correspond, for example, to an industrial robot, a user appliance of any type, and so on. The robot will determine whether the command corresponds to a recognizable instance of LI. If so, the robot will perform whatever action is associated with the LI. As in the case above, each instance of LI may correspond to a sequence of poses, which, in turn, may be expressed using skeletal tracking data. The skeletal tracking data can be generated by a training system by observing the actual movements of physical robots.

Performing search and retrieval. In a third application, a user may specify a phrase in any manner, e.g., using a voice input mechanism, a key input mechanism, etc. The application will again determine whether this phrase corresponds to a recognizable instance of LI. If so, the application can perform a retrieval operation directed at whatever feature is associated with the LI. For example, the feature may correspond to a file or other item within a repository, a location within a document, and so on.

The above kind of application can also be used to handle question-and-answer tasks. For example, assume that the user presents the question, "How do I disable the touch pad of my laptop?" Presume that this question corresponds to an instance of LI that was collected in response to presenting the recipients 106 with a visual depiction of someone disabling their touchpad. Upon recognizing the question, the application can present information to the user regarding the identified topic. If the application also embodies control capabilities, it can also automatically perform an action which addresses the user's question.

In another case, an instance of LI can be directed to a feature that is expressed as image recognition results. For example, assume that the user speaks the word "dog" in the context of a photo analysis application. The application can associate the word "dog" with predetermined image recognition results (e.g., a pattern, etc.), and then use the results to determine whether a particular photo contains a dog-like object. If the application also embodies control capabilities, it can perform some action on the identified object, such as by highlighting it, extracting it, etc.

Narrating real time action performed by a user. In a fourth application, any type of video monitoring system may detect the movement of a user. One such system is the Kinect® device produced by Microsoft Corporation of Redmond, Washington. That device uses structured light to produce a depth image of the user as the user performs an action or strikes a pose. The device then analyzes the depth image to determine the movement expressed therein, with reference to canonical movements expressed using skeletal tracking data.

This application can also use the pose tracking technology described in commonly-assigned U.S. Ser. No. 12/603,437, entitled "Pose Tracking Pipeline," naming the inventors of Matthew, et al., filed on Oct. 21, 2009, and/or pose tracking technology described in Shotton, et al., "Real-Time Human Pose Recognition in Parts from a Single Depth Image," *Proceedings of the* 2011 *IEEE Conference on Computer Vision and Pattern Recognition,* 2011, pp. 1297-1304. Still other techniques can be used to determine the movements of a human subject.

Presume that the action that the user has performed is successfully recognized by the application. That recognized action constitutes a feature associated with the application. The application then determines whether the feature is associated with an instance of LI. If so, the application may then annotate the action that the user is performing with the LI. For example, the application may display and/or vocalize the LI for the user as he or she plays a game. In addition, or alternatively, the application may store a series of instances of LI as the user plays the game. This information provides an easily-comprehensible record of actions that the user has performed. Other applications, besides games, can adopt the same manner of operation described above.

Further, any application can detect the user's behavior through some other input mechanism(s) besides, or in addition to, a video input mechanism. For example, the application can detect the user's behavior based on key, mouse, gesture, and/or voice input performed by the user. For example, assume that a user uses a mouse device to remove the effects of red eye within a photo editing application. The application can determine whether this series of input actions corresponds to a feature for which an instance of LI exists. If so, the application can perform any operation using the LI, some of which were set forth above in the game-related context.

Alternatively, or in addition, an application can detect the mere presence of an object in a prescribed context, and perform a narration-related operation in response thereto. That is, the detectable event here is the presence of the object itself, regardless of what the object may or may not be doing, or what is being done to the object. For example, an application can provide image recognition results that describe an object which appears in an image. The image recognition results constitute a feature. The application can then determine whether this feature is associated with an instance of LI. If so, the application can perform any operation using the instance of LI, such as labeling the object with the LI, generating an alarm, etc. To cite one concrete example, a webcam or the like can capture an image a user who is holding a particular object in his or her hand. An application can detect the object, associated it with an instance of LI (if the LI exists for this object), and then perform some action based on the LI.

In the above example, the application uses image recognition to determine the presence of an object in an image, but an application can use any technique to detect the presence of an object in any environment. For example, the application can detect an object based on any of: particular text typed by a user; a particular gesture made by the user on a touch input surface; a particular utterance or other sound made by the user, and so on. In other cases, the input event is generated by some non-human entity (e.g., a robot), or some environmental phenomenon, etc.

Narrating pre-recorded video. A fifth application may analyze pre-recorded video information or the like to determine if it contains any predetermined patterns, e.g., describing actions, objects, etc. If so, the application will determine whether any of these patterns have been previously associated with LI. If so, the application can perform any operations using the LI. For instance, the application can add the LI as metadata which accompanies corresponding frames of the video information.

Narrating action performed by the application itself. A sixth application may detect operations performed by the application itself Or the application may detect an operational state achieved by the application, or an event that occurs within the application, etc. These events are not necessarily prompted by actions taken by the user. The application can then determine whether these events have linguistic data associated therewith. If so, the application can perform any operation using the LI. For example, an Email application can determine that it has received a new Email in its inbox. If there is a linguistic description associated with this action, the application can provide a message to the user based on the linguistic description. In this case, the recipients 106 may have created the LI upon being shown a video of a message appearing in the inbox. In another example, an application can detect a low power state of a computer system which runs the application. If this state of affairs is associated with an instance of LI, the application can perform any action based on the LI.

Retrieving appropriate ads. An seventh application may identify behavior exhibited by the user, e.g., evidenced by motion detected by a video camera and/or input received through any other input mechanism(s). Or the application may identify the mere presence of an object in a particular context, etc. The application may then determine whether this input event corresponds to any instance of previously collected LI. If so, the seventh application can retrieve an advertisement associated with the LI. For example, assume that this application detects that the user is blowing her nose or that the user simply has a red nose. The application can retrieve the corresponding LI "blows nose with handkerchief" or "red nose," and use this LI to retrieve one or more relevant advertisements from a repository of advertisements, e.g., by performing a keyword search or the like. For example, one such advertisement may offer the user a discount on facial tissues.

Tutoring a user. An eighth application may analyze the behavior of the user as the user performs a task, such as dancing, swinging a golf club, etc. Alternatively, or in addition, the application can analyze a static state of affairs achieved by the user, or otherwise associated with the user. The application can then associate the user's action or state with LI. The application can then perform any operation using the LI. For example, assume that the user raises his head while striking a golf ball with a driver, which is not desirable. The application can detect this movement and offer the advice, "You are lifting your head while swinging." Or assume that the application detects that the user is slouching while working at her computer. The application can detect this static pose and offer the warning, "You are hunched over."

Monitoring the behavior of certain individuals. A ninth application may analyze the behavior or state of certain individuals, such as elderly people, infants, prisoners, and so on. The application can then determine whether these people are performing any actions or are associated with any states for which LI exists and which are considered undesirable, like falling (in the case of the elderly), rolling out of a crib (in the case of an infant), or attacking a guard (in the case of a prisoner). If these events or states are detected, then the ninth application can generate appropriate alarms and/or notify appropriate authorities. For example, one message that may be sent to a caretaker of an elderly person might be: "slips on floor." This linguistic content is gleaned from linguistic descriptions offered by recipients 106, upon being presented with a cartoon-like figure of a character slipping on the floor.

Other applications do not necessarily fall into the two categories specified above. For example, a tenth application can use the LI to create a translation model which maps sentences in a first language to sentences in a second language. An eleventh application uses the LI to produce paraphrase data. The paraphrase data provides one or more canonical representations of a collection of linguistic representations.

Further, a software development kit (SDK) for an application can be created which identifies the correlation between different instances of LI and associated features of a target environment. A developer can then use the SDK in any manner. For example, a developer can create programs which interact with an application by leveraging the instances of LI specified in the SDK.

Figure 8:
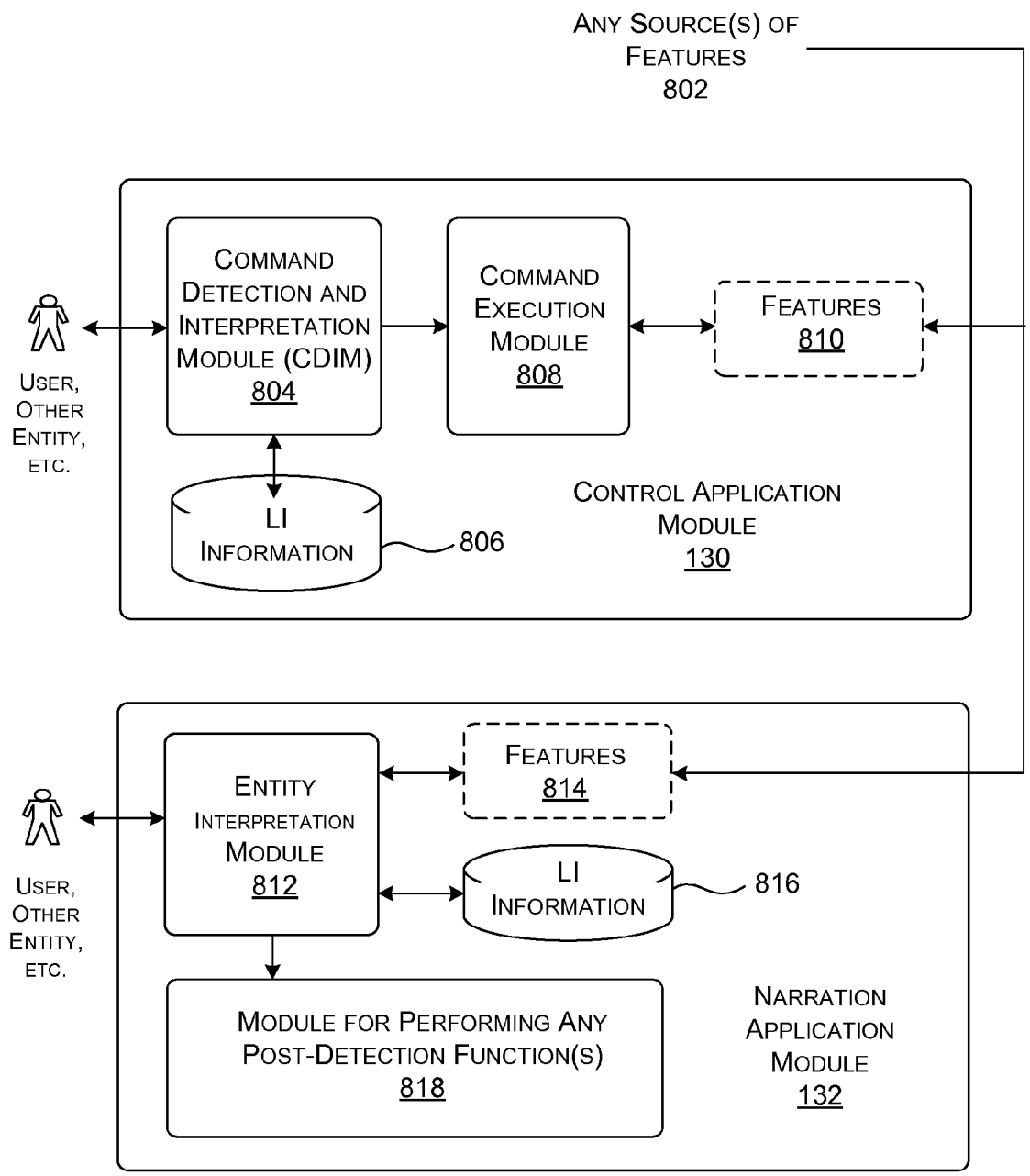
FIG. 8 shows an illustrative implementation of a control application module and a narration application module.

FIG. 8 summarizes some of the concepts described in this subsection by showing an illustrative implementation of the control application module 130 and the narration application module 132. Each application module may run on any type of computing system. An application module, when running on a computer system, can be characterized by a number of features. Without limitation, some of the features express actions (e.g., using skeleton tracking data, etc.). Other features describe objects (e.g., using image recognition results, three-dimensional graphics data, texture information, etc.). Any combination of sources 802 may provide some of these features.

The control application module 130 includes a command detection and interpretation module (CDIM) 804. The CDIM 804 detects a command provided by a user (or other entity) and then determines whether it matches an instance of LI stored in an LI store 806. A command execution module 808 executes whatever action is associated with the LI, or identifies whatever object is associated with the LI, etc. This operation applies or otherwise implicates a feature associated with the LI, such as by executing a behavior that is described using skeletal tracking data. That feature is part of a feature space 810 associated with the control application module 130.

The narration application module 132 includes an entity interpretation module 812 that detects an action performed by a user or other entity, or an object presented by the user or other entity. Or the entity interpretation module 812 detects an action/state associated with the narration application module 132 itself. The entity interpretation module 812 then determines whether the event that has been detected (whatever its nature) is associated with a feature in the feature space 814 of the narration application module 132. If so, the entity interpretation module 812 then determines whether that feature is associated with an instance of LI provided in an LI store 816. A module 822 can then perform any operation based on the LI, such as narrating the event that has been detected.

B. Illustrative Processes

Figure 9:
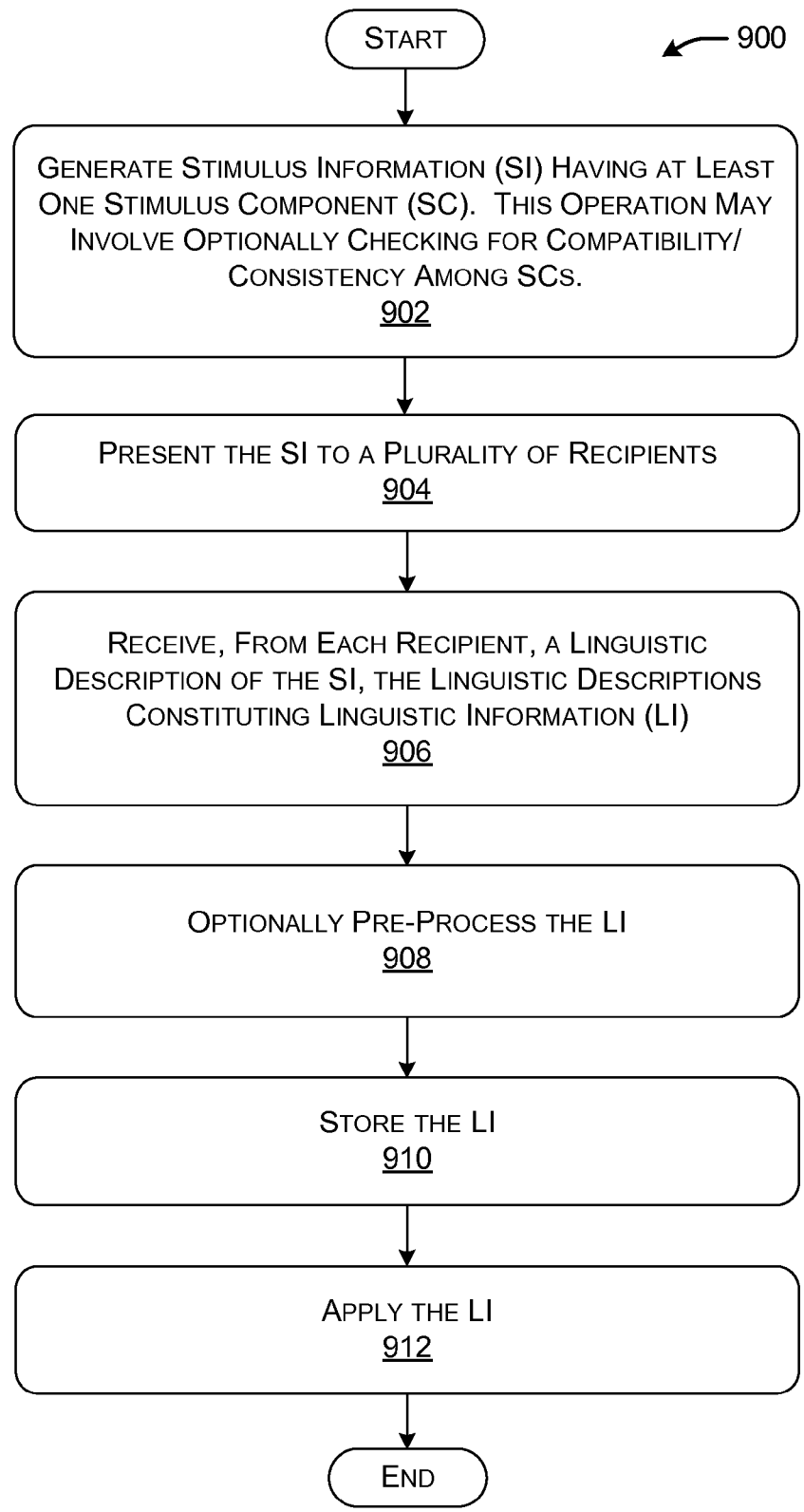
FIG. 9 shows a procedure which describes one manner of operation of the processing system of FIG. 1.
Figure 10:
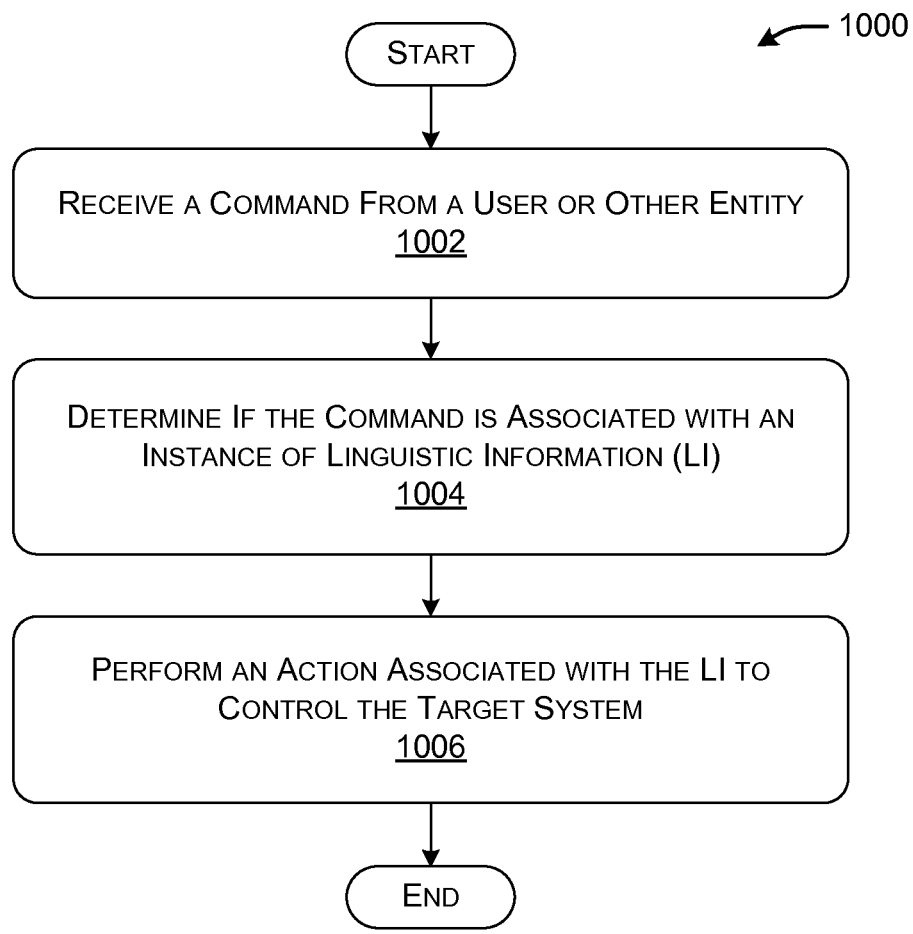
FIG. 10 shows a procedure which describes the use of the LI to control a target system.
Figure 11:
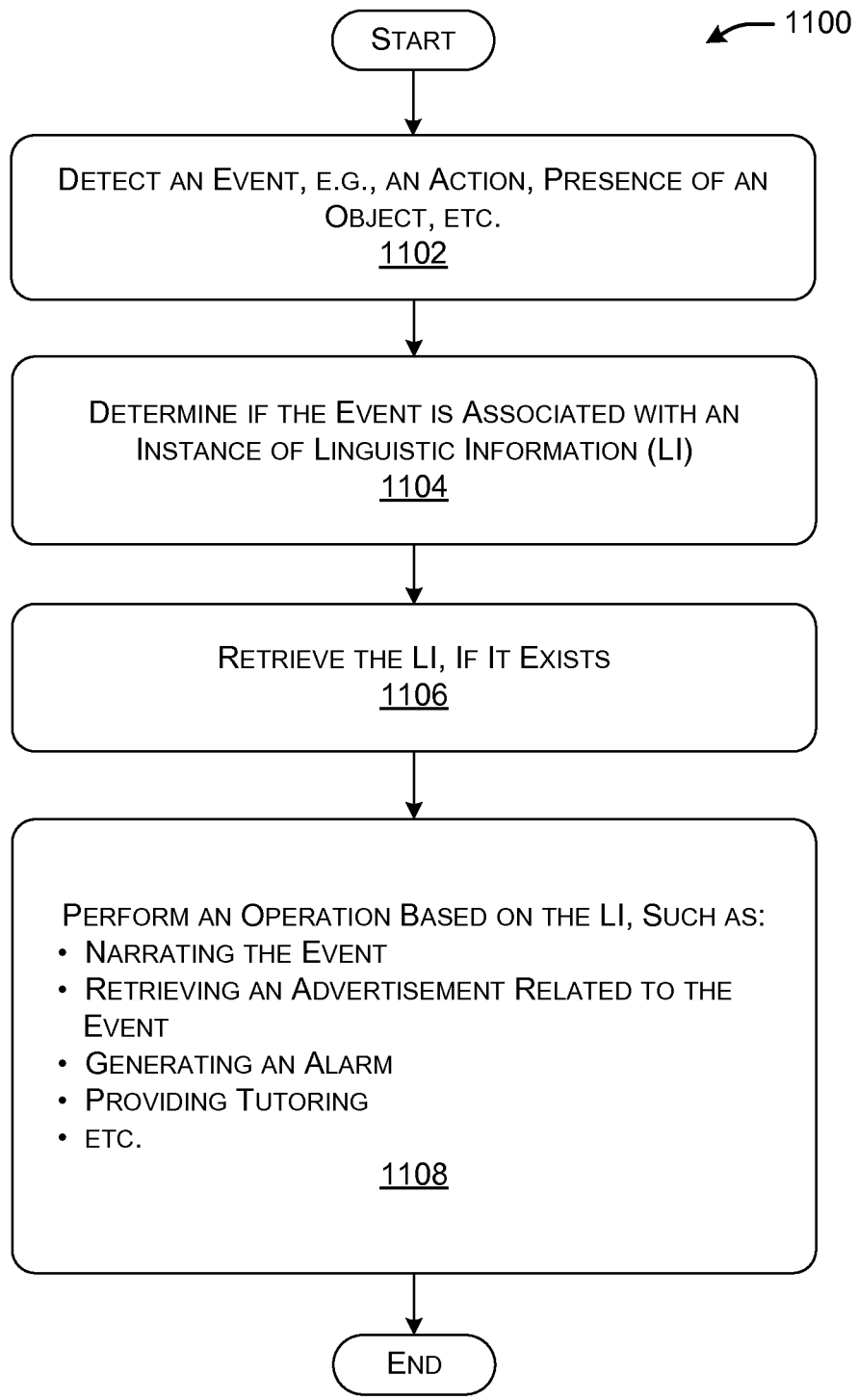
FIG. 11 shows a procedure which describes the use of the LI to narrate actions detected by a target system.

FIGS. 9-11 show procedures that explain one manner of operation of the processing system 100 of FIG. 1. Since the principles underlying the operation of the processing system 100 have already been described in Section A, certain operations will be addressed in summary fashion in this section.

Starting with the procedure 900 of FIG. 9, in block 902, the processing system 100 generates SI having at least one SC. This operation can be performed in fully automated manner, in a partially automated manner, or an entirely manual manner. In block 704, the processing system 100 presents the SI to the recipients 106 using any crowdsourcing technique. In block 906, the processing system 100 receives a plurality of linguistic descriptions from the recipients 106 in response to the SI. Collectively, these descriptions are referred to as LI. In block 908, the processing system 100 optionally pre-processes the LI, such as by removing noise from the LI. In block 910, the processing system 100 stores the LI in the data store 128. In block 912, the processing system 100 applies the LI.

FIG. 10 shows a procedure 1000 for controlling a target system based on LI. In block 1002, the target system receives a linguistically-expressed command from the user or other entity. In block 1004, the target system determines if the command is associated with an instance of LI. In block 806, the target system performs whatever action is associated with the LI, or identifies whatever object is associated with the LI. This operation applies or is otherwise associated with a feature of the target system that is associated with the LI.

FIG. 11 shows a procedure 1100 for narrating events based on LI. In block 1102, the target system detects that an event has occurred, e.g., based on input received from any input mechanism or combination of input mechanisms. In one case, this event corresponds to behavior that is performed by the user (or other entity) or an object that is presented by the user (or other entity), which is detected by the target system. In another case, this event corresponds to action that is performed by the target system itself or a state achieved by the target system, which may or may not have been prompted by actions made by the user. In block 1104, the target system determines if the event corresponds to an instance of LI. In block 1106, the target system retrieves the appropriate instance of LI if it exists. In block 1108, the target system performs any kind of operation based on the LI that has been retrieved. In one such operation, the target system annotates the event with the LI.

C. Representative Computing Functionality

FIG. 12 sets forth illustrative computing functionality 1200 that can be used to implement any aspect of the functions described above. For example, the type of computing functionality 1200 shown in FIG. 12 can be used to implement any aspect of the processing system 100 of FIG. 1, including any of: the generation system 102; the crowd interaction module 104; any of the applications 108; any of the user devices 124, and so on. In one case, the computing functionality 1200 may correspond to any type of computing device that includes one or more processing devices. In all cases, the computing functionality 1200 represents one or more physical and tangible processing mechanisms.

The computing functionality 1200 can include volatile and non-volatile memory, such as RAM 1202 and ROM 1204, as well as one or more processing devices 1206 (e.g., one or more CPUs, and/or one or more GPUs, etc.). The computing functionality 1200 also optionally includes various media devices 1208, such as a hard disk module, an optical disk module, and so forth. The computing functionality 1200 can perform various operations identified above when the processing device(s) 1206 executes instructions that are maintained by memory (e.g., RAM 1202, ROM 1204, or elsewhere).

More generally, instructions and other information can be stored on any computer readable medium 1210, including, but not limited to, static memory storage devices, magnetic storage devices, optical storage devices, and so on. The term computer readable medium also encompasses plural storage devices. In many cases, the computer readable medium 1210 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1200 also includes an input/output module 1212 for receiving various inputs (via input devices 1214), and for providing various outputs (via output devices). Illustrative input devices include a keyboard device, a mouse input device, a touchscreen input device, a gesture input device, a voice recognition mechanism, and so on. One particular output device may include a presentation device 1216 and an associated graphical user interface (GUI) 1218. The computing functionality 1200 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), point-to-point connections, etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described herein can employ various mechanisms to ensure the privacy of user data maintained by the functionality (if any). For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for using grounded linguistic data, comprising:
    generating stimulus information having at least one stimulus component selected from an inventory of available stimulus components;
    presenting the stimulus information to a plurality of human recipients;
    receiving, from each human recipient, a linguistic description of the stimulus information, a plurality of received linguistic descriptions collectively comprising linguistic information expressed in one or more languages;

storing the linguistic information in a data store,
there being a nexus between the linguistic information and said at least one stimulus component that forms a part of the stimulus information,
there being an additional nexus between each stimulus component and a feature of a target environment;
detecting an event, the event constituting the feature of the target environment;
determining whether the event is associated with an instance of the linguistic information; and
performing, by one or more processing devices, an operation using the instance of the linguistic information, providing that said determining is answered in the affirmative.

2. The method of claim 1, wherein the stimulus information comprises one or more of:
animated visual stimulus information;
audio stimulus information; and
static image stimulus information.

3. The method of claim 1, wherein the target environment corresponds to a target computer system.

4. The method of claim 3, wherein at least one kind of feature associated with the target computer system corresponds to an object.

5. The method of claim 4, wherein the object is expressed using image recognition data.

6. The method of claim 3, wherein at least one kind of feature associated with the target computer system corresponds to a state that is achievable by the target computer system.

7. The method of claim 3, wherein at least one kind of feature associated with the target computer system corresponds to a data item.

8. The method of claim 3, wherein at least one kind of feature associated with the target computer system corresponds to a behavior.

9. The method of claim 8, wherein the behavior is expressed using skeletal tracking data.

10. The method of claim 1, wherein said generating comprises selecting two or more stimulus components from the inventory, based on a parameterized component table which describes the available stimulus components in the inventory.

11. The method of claim 10, wherein said generating further comprises ensuring that the stimulus components that are selected are compatible with each other.

12. The method of claim 1, wherein said presenting comprises conveying the stimulus information as part of a challenge-response authentication task.

13. The method of claim 1, further comprising analyzing the linguistic information to determine the nexus between each stimulus component in the stimulus information and a corresponding feature of the target environment.

14. The method of claim 1, further comprising:
receiving a linguistically-expressed command;
determining whether the command is associated with an instance of the linguistic information, the instance of the linguistic information being associated, in turn, with the feature of the target environment; and
performing a control action that is associated with the feature, providing that said determining is answered in the affirmative.

15. The method of claim 1, further comprising:
producing a plurality of instances of the stimulus information; and
adapting one or more instances of the plurality of instances based on the plurality of received linguistic descriptions.

16. The method of claim 15, wherein said performing comprises narrating an event that is detected by said detecting.

17. A processing system for generating animated visual stimulus information, said processing system comprising:
a data store that stores a plurality of animated visual stimulus components, for at least some animated visual stimulus components, there being a nexus between each animated visual stimulus component and a movement, for at least some other animated visual stimulus components, there being a nexus between each other animated visual stimulus component and an object; and
a generation module that generates the animated visual stimulus information having at least one animated visual stimulus component selected from the data store storing the plurality of animated visual stimulus components, the animated visual stimulus information being for use in soliciting linguistic descriptions from a group of human recipients.

18. The processing system of claim 17, wherein the generation module is configured to produce a plurality of instances of the animated visual stimulus information, to carry out a data collection regimen.

19. The processing system of claim 18, wherein the generation module is configured to adapt the instances of the animated visual stimulus information that are produced based on linguistic descriptions that are received.

20. A computer readable storage medium for storing computer readable instructions, the computer readable instructions providing a processing system when executed by one or more processing devices, the computer readable instructions comprising:
logic configured to generate animated visual stimulus information having at least one animated visual stimulus component selected from an inventory of available animated visual stimulus components,
for at least some animated visual stimulus components, there being a nexus between each animated visual stimulus component and a movement,
for at least some other animated visual stimulus components, there being a nexus between each other animated visual stimulus component and an object,
the animated visual stimulus information being for use in soliciting linguistic descriptions from a group of human recipients.

21. A method for collecting grounded linguistic data, comprising:
generating, by one or more processing devices, stimulus information having at least one stimulus component selected from an inventory of available stimulus components;
presenting the stimulus information to a plurality of human recipients, wherein said presenting comprises conveying the stimulus information as part of a challenge-response authentication task;
receiving, from each human recipient, a linguistic description of the stimulus information, a plurality of received linguistic descriptions collectively comprising linguistic information expressed in one or more languages; and
storing the linguistic information in a data store,
there being a nexus between the linguistic information and said at least one stimulus component that forms a part of the stimulus information,
there being an additional nexus between each stimulus component and a feature of a physical target environment.

22. A method for collecting grounded linguistic data, comprising:
- generating, by one or more processing devices, stimulus information having at least one stimulus component selected from an inventory of available stimulus components;
- presenting the stimulus information to a plurality of human recipients;
- receiving, from each human recipient, a linguistic description of the stimulus information, a plurality of received linguistic descriptions collectively comprising linguistic information expressed in one or more languages; and
- storing the linguistic information in a data store,
- there being a nexus between the linguistic information and said at least one stimulus component that forms a part of the stimulus information,
- there being an additional nexus between each stimulus component and a feature of a target computer system, wherein the feature corresponds to a behavior, wherein the behavior is expressed using skeletal tracking data.

23. A method for collecting grounded linguistic data, comprising:
- generating, by one or more processing devices, stimulus information having at least one stimulus component selected from an inventory of available stimulus components, wherein said generating comprises selecting two or more stimulus components from the inventory, based on a parameterized component table which describes the available stimulus components in the inventory;
- presenting the stimulus information to a plurality of human recipients;
- receiving, from each human recipient, a linguistic description of the stimulus information, a plurality of received linguistic descriptions collectively comprising linguistic information expressed in one or more languages; and
- storing the linguistic information in a data store,
- there being a nexus between the linguistic information and said at least one stimulus component that forms a part of the stimulus information,
- there being an additional nexus between each stimulus component and a feature of a physical target environment.

24. A method for collecting grounded linguistic data, comprising:
- generating stimulus information having at least one stimulus component selected from an inventory of available stimulus components;
- presenting the stimulus information to a plurality of human recipients;
- receiving, from each human recipient, a linguistic description of the stimulus information, a plurality of received linguistic descriptions collectively comprising linguistic information expressed in one or more languages;
- storing the linguistic information in a data store,
- there being a nexus between the linguistic information and said at least one stimulus component that forms a part of the stimulus information,
- there being an additional nexus between each stimulus component and a feature of a target environment;
- receiving a linguistically-expressed command;
- determining whether the command is associated with an instance of the linguistic information, the instance of the linguistic information being associated, in turn, with the feature of the target environment; and
- performing a control action that is associated with the feature, providing that said determining is answered in the affirmative.

25. A method for generating animated visual stimulus information, comprising:
- generating the animated visual stimulus information having at least one animated visual stimulus component selected from an inventory of available animated visual stimulus components,
- for at least some animated visual stimulus components, there being a nexus between each animated visual stimulus component and a movement,
- for at least some other animated visual stimulus components, there being a nexus between each other animated visual stimulus component and an object,
- the animated visual stimulus information being for use in soliciting linguistic descriptions from a group of human recipients.

* * * * *